US012655312B2

(12) United States Patent
Miyazawa et al.

(10) Patent No.: US 12,655,312 B2
(45) Date of Patent: Jun. 16, 2026

(54) INKJET INK AND TABLET PRINTED MATTER

(71) Applicant: TOPPAN HOLDINGS INC., Tokyo (JP)

(72) Inventors: Yasuhisa Miyazawa, Tokyo (JP); Yuichi Hoshino, Tokyo (JP); Seiya Koseki, Tokyo (JP); Risa Hashimoto, Tokyo (JP); Takumi Tanioka, Tokyo (JP); Misa Sanpei, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/963,675

(22) Filed: Nov. 28, 2024

(65) Prior Publication Data

US 2025/0179319 A1      Jun. 5, 2025

(30) Foreign Application Priority Data

Nov. 30, 2023      (JP) ................................. 2023-203257

(51) Int. Cl.
*B32B 3/14*          (2006.01)
*C09D 11/033*      (2014.01)
(Continued)

(52) U.S. Cl.
CPC .............. *C09D 11/328* (2013.01); *B32B 3/14* (2013.01); *C09D 11/033* (2013.01); *C09D 11/037* (2013.01); *C09D 11/38* (2013.01)

(58) Field of Classification Search
CPC .. B32B 3/00; B32B 3/14; C09D 11/30; C09D 11/38; C09D 11/54; C09D 11/322; C09D 11/328
See application file for complete search history.

(56) References Cited

U.S. PATENT DOCUMENTS

2023/0203329 A1*   6/2023   Koseki ................... C09D 11/14
                                                                 347/100

FOREIGN PATENT DOCUMENTS

JP        2012-111824  A      6/2012
JP        2018-100336  A      6/2018
(Continued)

OTHER PUBLICATIONS

JP 2019-059925 (Year: 2019).*
(Continued)

*Primary Examiner* — Elizabeth E Mulvaney
(74) *Attorney, Agent, or Firm* — Foley & Lardner LLP

(57)          ABSTRACT

An inkjet ink that sufficiently suppresses photodiscoloration and/or photofading of printed images and has excellent lightfastness and tablet printed matter including printed parts printed with the inkjet ink. An inkjet ink according to this embodiment contains: Blue No. 1 as a food dye; and water and ethanol as a solvent, in which, when only trehalose is contained as a fixing agent, the compounding ratio of the trehalose is in the range of 7.5 mass % or more and 20.0 mass % or less based on the total mass of the inkjet ink and, when trehalose and reduced isomaltulose are contained as the fixing agent, the compounding ratio of the trehalose is in the range of 2.5 mass % or more and 15.0 mass % or less based on the total mass of the inkjet ink and the compounding ratio of the reduced isomaltulose is 10.0 mass % or less based on the total mass of the inkjet ink.

14 Claims, 2 Drawing Sheets

(51) Int. Cl.
　　*C09D 11/037*　　　(2014.01)
　　*C09D 11/328*　　　(2014.01)
　　*C09D 11/38*　　　(2014.01)

(56) References Cited

FOREIGN PATENT DOCUMENTS

| | | | |
|---|---|---|---|
| JP | | 6389506 B2 | 9/2018 |
| JP | | 7347700 B1 | 9/2023 |
| WO | WO-2022/050128 A1 | | 3/2022 |

OTHER PUBLICATIONS

JP 6947265 (Year: 2021).*
Japanese Patent Office, "Notice of Reasons for Refusal," issued in connection with Japanese Patent Application No. 2023-203257, dated Dec. 22, 2023.
Japanese Patent Office, "Decision of Refusal," issued in connection with Japanese Patent Application No. 2023-203257, dated Mar. 4, 2024.

\* cited by examiner

INKJET INK AND TABLET PRINTED MATTER

TECHNICAL FIELD

The present invention relates to an inkjet ink and tablet printed matter.

BACKGROUND ART

Some inkjet printing inks (hereinafter also simply referred to as an "inkjet ink") are edible with use of food dyes, such as tar pigments, for example, as colorants.

Conventionally, some inkjet inks cause discoloration in which the color tone (hue) of the colorants has changed in printed characters, images, and the like due to the deterioration of the colorants or cause fading due to desaturation or the like of the colorants. For example, when the inkjet inks are insufficient in lightfastness, the colorants can be affected by light and decompose (undergo photolysis) to cause discoloration and/or fading (photodiscoloration and/or photofading). Such discoloration and/or fading is perceived as a decrease in visibility in printed characters, images, and the like (hereinafter collectively referred to as "printed images").

To suppress the discoloration and/or fading of the printed images, technologies are being developed, and various methods for suppressing the discoloration and/or fading have been proposed (e.g., PTL 1). However, according to the conventional method, the photodiscoloration and/or photofading of the printed images has not been sufficiently suppressed and the lightfastness of the inkjet ink has not been able to be enhanced.

For example, with respect to Blue No. 1 among the food dyes, the lightfastness of the inkjet inks is sometimes improved by compounding reduced isomaltulose in the inkjet inks.

The reduced isomaltulose is a substance classified into disaccharides, and the reduced isomaltulose has relatively low solubility in water as compared with other disaccharides.

Therefore, the proportion (upper limit of the content) of the reduced isomaltulose that can be added in the inkjet ink is sometimes difficult to sufficiently increase.

CITATION LIST

Patent Literature

PTL 1: JP 6389506 B

SUMMARY OF INVENTION

Technical Problem

The present inventors have found that a further improvement of the lightfastness of the inkjet ink requires the addition of a lightfast inhibitor having higher solubility to the inkjet ink.

The present invention has been made in view of the above-described respects. It is an object of the present invention to provide an inkjet ink that sufficiently suppresses the photodiscoloration and/or photofading of printed images and has enhanced lightfastness and tablet printed matter including printed parts printed with the inkjet ink.

To achieve the above-described object, an inkjet ink according to one aspect of the present invention contains:

Blue No. 1 as a food dye; only trehalose as a fixing agent; and water and ethanol as a solvent, in which the compounding ratio of the trehalose is in the range of 7.5 mass % or more and 20.0 mass % or less based on the total mass of the inkjet ink.

To achieve the above-described object, an inkjet ink according to one aspect of the present invention contains: Blue No. 1 as a food dye; trehalose and reduced isomaltulose as a fixing agent; and water and ethanol as a solvent, in which the compounding ratio of the trehalose is in the range of 2.5 mass % or more and 15.0 mass % or less based on the total mass of the inkjet ink and the compounding ratio of the reduced isomaltulose is 10.0 mass % or less based on the total mass of the inkjet ink.

To achieve the above-described object, the tablet printed matter according to one aspect of the present invention includes: printed parts printed using the above-described inkjet ink.

Advantageous Effects of Invention

One aspect of the present invention can sufficiently suppress the photodiscoloration and/or photofading of the printed images and enhance the lightfastness of the inkjet ink.

DESCRIPTION OF EMBODIMENTS

An inkjet ink according to an embodiment of the present invention (hereinafter referred to as "this embodiment") relates to an inkjet ink capable of sufficiently suppressing the photodiscoloration and/or photofading of printed images and the like printed on the surfaces of medicine tablets by an inkjet printing method and improving the lightfastness, for example. Hereinafter, the compositions of the inkjet ink and the tablet including printed parts printed with the inkjet ink according to the embodiment of the present invention are described in detail.

[Composition of Inkjet Ink]

The inkjet ink according to this embodiment is an edible inkjet ink and contains Food Blue No. 1 (hereinafter, simply referred to as "Blue No. 1") as a food dye (food pigment). The inkjet ink according to this embodiment further contains, as a fixing agent for fixing the ink to the surface of a printing target (e.g., solid formulation), saccharides having comparatively high solubility in water. Specifically, this embodiment uses trehalose (disaccharide) having solubility in 100 ml of 20° C. water of 69 g as the fixing agent. The inkjet ink according to this embodiment further contains the trehalose in the range of 7.5 mass % or more and 20.0 mass % or less based on the total mass of the inkjet ink. The inkjet ink according to this embodiment further contains water and ethanol as a solvent.

This embodiment uses trehalose and reduced isomaltulose (disaccharide) having solubility in 100 ml of 20° C. water of 38 g as the fixing agent. The inkjet ink according to this embodiment contains the trehalose in the range of 2.5 mass % or more and 15.0 mass % or less based on the total mass of the inkjet ink. The inkjet ink according to this embodiment contains the reduced isomaltulose in the range of 10.0 mass % or less based on the total mass of the inkjet ink. The inkjet ink according to this embodiment contains water and ethanol as the solvent.

With such a composition, the photodiscoloration and/or photofading of the printed images can be sufficiently suppressed and the lightfastness of the inkjet ink can be enhanced.

Hereinafter, this respect is described with reference to FIGS. 1A to 1C.

Figure 1A:
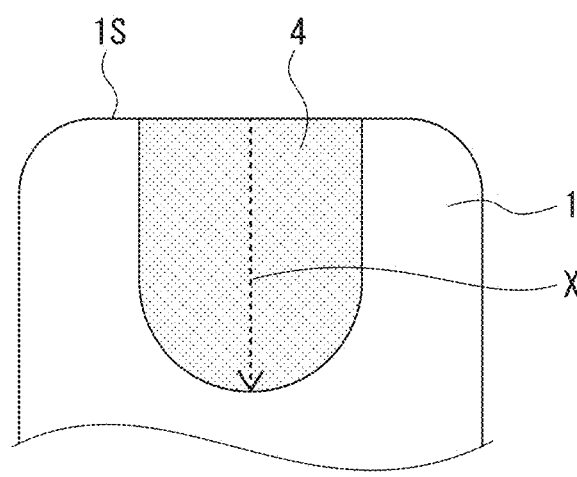
FIGS. 1A to 1C are conceptual views for explaining the permeability and the lightfastness of an inkjet ink in an embodiment of the present invention.
Figure 1B:
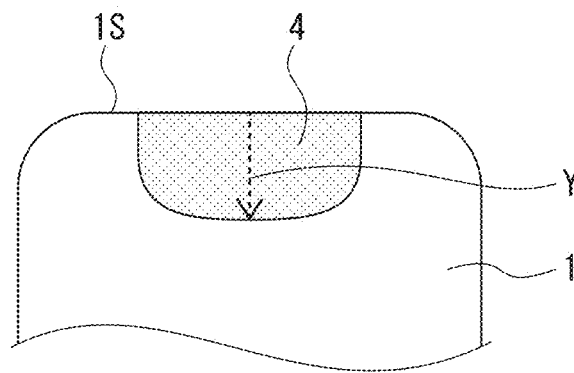
Figure 1C:
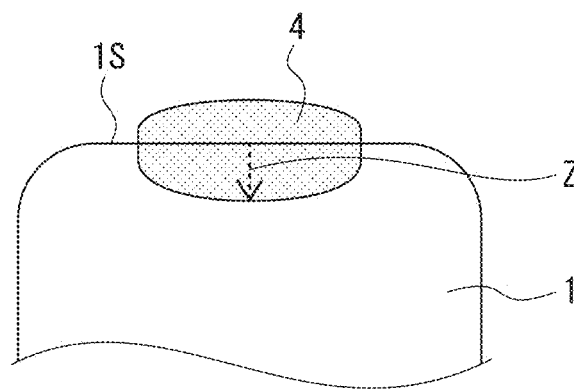

FIGS. 1A to 1C are conceptual views for explaining the relationship between the fixation and the lightfastness of the ink on the surface of the printing target (solid formulation). Herein, a tablet including a film-coated part having few voids, i.e., a film-coated tablet, is used as the solid formulation. The present invention is not limited thereto, and the printing target may also be an uncoated tablet or a capsule tablet.

FIGS. 1A to 1C are schematic cross-sectional views in the thickness direction of tablets (herein, film-coated tablets) after a certain period of time has passed from the printing of inkjet inks A to C having different compositions on the tablets. In this example, the inkjet ink A is an ink containing a specific dye 4 as a colorant and containing water as the solvent. Herein, the specific dye 4 may contain the Blue No. 1. The inkjet ink B is an ink obtained by adding predetermined saccharide to the inkjet ink A. Herein, the saccharide added to the inkjet ink B is a saccharide having relatively low solubility in water and not corresponding to the fixing agent in this embodiment (e.g., reduced isomaltulose). The inkjet ink C is an ink obtained by adding the disaccharides having relatively high solubility in water and corresponding to the fixing agent in this embodiment (i.e., trehalose) and further adding water and ethanol as the solvent to the inkjet ink A.

Specifically, FIG. 1A is a schematic cross-sectional view in the thickness direction of the tablet when a certain period of time (e.g., 140 hours) has passed from the printing of the inkjet ink A on a surface 1S of a substrate 1 of the tablet, the inkjet ink A containing the specific dye 4 as the colorant and containing water as the solvent. FIG. 1B is a schematic cross-sectional view in the thickness direction of the tablet when a certain period of time (e.g., 140 hours) has passed from the printing of the inkjet ink B on the surface 1S of the substrate 1 of the tablet. FIG. 1C is a schematic cross-sectional view in the thickness direction of the tablet when a certain period of time (e.g., 140 hours) has passed from the printing of the inkjet ink C on the surface 1S of the substrate 1 of the tablet.

First, the addition or non-addition of the saccharides and the permeability of the dyes in the inkjet inks are described taking the inkjet inks A, B as examples.

Among various colorants used for the inkjet inks, tar pigments used as the food dye, for example, can cause discoloration and/or fading in characters, images, and the like printed on the surfaces of solid formulations or the like. For example, the Blue No. 1 among the tar pigments has caused discoloration and/or fading of the printed images due to permeation into the solid formulations with the lapse of time or photolysis. To address the problem, a method for suppressing the permeation of the dye into the solid formulations and suppressing the discoloration and/or fading of the printed images by adding saccharides to the inkjet inks is known.

As illustrated in FIG. 1A, when the inkjet ink A containing no saccharides is printed, the specific dye 4 permeates into the substrate 1 of the tablet after the lapse of the certain period of time from the printing. Herein, the depth of the permeation of the specific dye 4 in the inkjet ink A after the lapse of the certain period of time is defined as a permeation depth X (μm). In contrast thereto, when the inkjet ink B containing the saccharide is printed, a permeation depth Y (μm) of the inkjet ink B is smaller than the permeation depth X of the inkjet ink A (X>Y) after the lapse of the certain period of time from the printing as illustrated in FIG. 1B.

In the inkjet ink B, the addition of the predetermined saccharide increases the viscosity or the like of the ink, suppressing the permeation of the specific dye 4 into the substrate 1 of the tablet. Therefore, when the inkjet ink B is printed, the specific dye 4 remains in the vicinity of the surface 1S in the substrate 1 of the tablet even after the lapse of the certain period of time from the printing. More specifically, the inkjet ink containing the predetermined saccharide can suppress the discoloration and/or fading of the printed images due to the permeation of the dye (i.e., Blue No. 1) as compared with a case where no saccharides are added. Meanwhile, the inkjet ink B added with the predetermined saccharide cannot sufficiently suppress the discoloration and/or fading (photodiscoloration and/or photofading) of the printed images due to irradiation with light.

In contrast thereto, the inkjet ink according to this embodiment fixes the ink to the surface of the printing target to sufficiently suppress the photodiscoloration and/or photofading of the printed images and enhance the lightfastness by selecting the type or the physical properties of the saccharides and the solvent to be added. The present inventors have found that the fixing of the ink onto the surface of the printing target (e.g., tablet) is effective for suppressing the photodiscoloration and/or photofading of the printed images. In this example, the ink is fixed onto the surface 1S of the tablet to thereby fix the specific dye 4 onto the surface 1S, and, as a result, the specific dye 4 can be allowed to remain at a high density on the surface 1S.

A high density of the specific dye 4 on the surface 1S of the substrate 1 of the tablet reduces the proportion of the colorant causing the photodiscoloration and/or photofading due to the photolysis of the specific dye 4 on the surface 1S, for example. More specifically, even when the photodiscoloration and/or photofading occurs in a part of the specific dye 4, the influence is limited, and the decrease in visibility (readability) of the printed images is suppressed. Thus, the visibility of the whole printed images can be maintained, and, as a result, the photodiscoloration and/or photofading of the printed images can be sufficiently suppressed. Therefore, the lightfastness of the inkjet ink can be enhanced. Then, the present inventors have found that disaccharides among saccharides function as the fixing agent fixing the ink containing the Blue No. 1 as the colorant to the surface of the printing target. Further, the present inventors have found that, by the use of a substance having relatively high solubility in the solvent with respect to the above-described disaccharides used as the fixing agent, the addition amount of the disaccharides in the inkjet ink can be increased and an ink fixing effect is reliably exhibited.

Specifically, the inkjet ink according to this embodiment contains the Blue No. 1 as the food dye, which is the colorant, only trehalose as the fixing agent, and water and ethanol as the solvent. The compounding ratio of the trehalose is in the range of 7.5 mass % or more and 20.0 mass % or less based on the total mass of the inkjet ink.

Further, the inkjet ink according to this embodiment contains the Blue No. 1 as the food dye, which is the colorant, trehalose and reduced isomaltulose as the fixing agent, and water and ethanol as the solvent. The compounding ratio of the trehalose is in the range of 2.5 mass % or more and 15.0 mass % or less based on the total mass of the inkjet ink. The compounding ratio of the reduced isomaltulose is 10.0 mass % or less based on the total mass of the inkjet ink.

With such a composition, the ink containing the specific tar pigment (Blue No. 1 in this example) used as the colorant can be fixed to the surface of the printing target, and the above-described specific tar pigment can be allowed to remain at a high density on the surface. Thus, the inkjet ink according to this embodiment can sufficiently suppress the photodiscoloration and/or photofading of the printed images and enhance the lightfastness.

As illustrated in FIG. 1C, when the inkjet ink C corresponding to the inkjet ink according to this embodiment is printed on the surface 1S of the substrate 1 of the tablet, the specific dye 4 (herein, Blue No. 1) in the ink is fixed to the surface 1S. Specifically, when the inkjet ink C is printed, a permeation depth Z (μm) of the specific dye 4 after the lapse of the certain period of time from the printing is further reduced as compared with the permeation depth Y of the specific dye 4 in the inkjet ink B containing the predetermined saccharide (Y>Z). For example, the permeation depth Z of the specific dye 4 in the inkjet ink C is reduced to about 50% of the permeation depth Y of the specific dye 4 in the inkjet ink B. More specifically, the inkjet ink C can further suppress the permeation of the specific dye 4. Therefore, the specific dye 4 remains at a high density on the surface 1S, and the decrease in the visibility of the printed images is suppressed as described above. Thus, the photodiscoloration and/or photofading of the printed images is sufficiently suppressed, and the inkjet ink C can enhance the lightfastness.

Meanwhile, the inkjet ink B allows the specific dye 4 to remain in the vicinity of the surface 1S inside the substrate 1 of the tablet, but the permeation of the specific dye 4 cannot be sufficiently suppressed and the ink cannot be fixed onto the surface 1S. More specifically, in the inkjet ink B, the density of the specific dye 4 remaining on the surface 1S is low, and therefore the photodiscoloration and/or photofading of the printed images cannot be sufficiently suppressed, and the lightfastness is not enhanced (improved).

Thus, the inkjet ink according to this embodiment is added with the above-described disaccharides (only trehalose or a mixture of trehalose and reduced isomaltulose) as the fixing agent and contains the solvent having the above-described component composition (mixed solvent of water and ethanol), and thus the permeation of the specific tar pigment (Blue No. 1) into the printing target is significantly suppressed and the ink is fixed to the surface of the printing target. Thus, the inkjet ink according to this embodiment can suppress the photodiscoloration and/or photofading of the printed images and enhance the lightfastness, and further, can suppress even the discoloration and/or fading of the printed images due to the permeation of the above-described specific tar pigment into the printing target.

As illustrated in FIG. 1C, the inkjet ink C can be fixed onto the surface 1S of the substrate 1 of the tablet to be slightly raised. Thus, when the inkjet ink C is printed, for example, the printing is perceived as deep and floating on the surface 1S. Therefore, the inkjet ink C can enhance the visibility in the printing of the printed images as compared with the inkjet inks A, B, for example. More specifically, the inkjet ink according to this embodiment can impart good visibility to the printed images at the time of the printing in addition to reducing the decrease in the visibility due to the photodiscoloration and/or photofading of the printed images.

Hereinafter, the details of the lightfastness in the inkjet ink according to this embodiment are described.

The inkjet ink according to this embodiment may have a color difference ΔE according to JIS Z 8781 before and after a lightfastness test of 25 or less. Herein, the lightfastness test refers to a test of comparing the color differences ΔE (according to JIS Z 8781) for the printed images printed using the inkjet ink according to this embodiment, for example, the color difference ΔE indicating the change in the chromaticity and the optical color density before and after irradiation with visible light. Specifically, the color difference ΔE is measured before and after the emission of a cumulative 1.2 million lux of visible light to the printed images, and the values are compared. For the irradiation with the visible light, a photostability tester (LT-120A-WD, Nagano Science) is used, for example. The printed images in the lightfastness test are solid-printed images solid-printed on a tablet (e.g., film-coated tablet), which is the printing target, for example.

The lightfastness necessary and sufficient for the formation of the printed images on medicine tablets and the like refers to, in the lightfastness test in which the printed images are irradiated with a 1.2 million lux of visible light under normal humidity (60% RH in a chamber where the tester is installed), a case where the color difference ΔE of the printed images before and after the irradiation with the visible light is 25 or less in many cases. Use of the color difference ΔE of 25 or less as the criterion of sufficient lightfastness has been derived as a result of opinion tests carried out by the present inventors with medical professionals. When the color difference ΔE exceeds 25, a decrease in the visibility (e.g., readability of printing) of the printed images begins to be perceived. More specifically, when the color difference ΔE before and after the irradiation with the visible light is 25 or less, it can be said that the inkjet ink sufficiently suppresses the photodiscoloration and/or photofading and has excellent lightfastness. Although this numerical value is larger than the standard color difference ΔE of 3 to 6 in general commercial printed matter, tablets before and after the exposure to light are usually not compared, and the printed images of the tablet surfaces are assumed to naturally fade, and therefore this numerical value was able to be obtained.

The reason why the inkjet ink according to this embodiment contains the disaccharides having comparatively high solubility in 100 ml of 20° C. water (e.g., trehalose having solubility in 100 ml of 20° C. water of 69 g) as the fixing agent and contains the solvent of the above-described component composition is as follows. When only saccharides having comparatively low solubility in 100 ml of 20° C. water (e.g., reduced isomaltulose having solubility in 100 ml of 20° C. water of 38 g) are added or when a solvent not having the above-described component composition is used, the specific tar pigment, i.e., the Blue No. 1, on the tablet surface is not sufficiently fixed to the surface of the printing target, and the color difference ΔE exceeds 25 when the above-described lightfastness test is performed for the solid-printed images. By adding the disaccharides having comparatively high solubility in water as the fixing agent and using a solvent satisfying the above-described component composition to increase the solubility of the above-described disaccharides in the solvent, the color difference ΔE before and after the lightfastness test falls below 25, and excellent lightfastness is imparted to the inkjet ink.

Hereinafter, each component constituting the inkjet ink according to this embodiment is described.

(Colorant)

As described above, the inkjet ink according to this embodiment contains at least the Blue No. 1 as the food dye. The blue No. 1 is an edible tar pigment, and is also referred to as Brilliant Blue FCF.

When the inkjet ink according to this embodiment contains only trehalose as the fixing agent, the compounding ratio of the food dyes including the above-described specific tar pigment (Blue No. 1), i.e., the total content of the food dyes, is preferably in the range of 1.0 mass % or more and 15.0 mass % or less based on the total mass of the ink.

When the inkjet ink according to this embodiment contains trehalose and reduced isomaltulose as the fixing agent, the compounding ratio of the food dyes including the above-described specific tar pigment (Blue No. 1), i.e., the total content of the food dyes, is preferably in the range of 1.0 mass % or more and 15.0 mass % or less based on the total mass of the ink.

With such a composition, good visibility can be imparted to the printed images and high intermittent resumability can be imparted to the printed images. When the total content of the food dyes is in the ranges above, the addition of the above-described fixing agent can more reliably allow the above-described specific tar pigment to remain at a high density on the surface of printed matter to suppress the photodiscoloration and/or photofading in the printed images and enhance the lightfastness of the inkjet ink according to this embodiment.

In contrast thereto, in the inkjet ink containing only trehalose as the fixing agent, when the total content of the above-described food dyes is less than 1.0 mass %, the whole printed color tends to be lighter and the visibility of the printed images tends to decrease. When the content of the food dye exceeds 15.0 mass %, the dissolution stability of the colorant deteriorates, so that the pigment in the ink is precipitated or deposited as a solid, causing nozzle clogging of an inkjet head in printing, and so-called printing resumability (intermittent resumability) can decrease.

In the inkjet ink containing trehalose and reduced isomaltulose as the fixing agent, when the total content of the above-described food dyes is less than 1.0 mass %, the whole printed color tends to be lighter and the visibility of the printed images tends to decrease. When the content of the food dyes exceeds 15.0 mass %, the dissolution stability of the colorant deteriorates, so that the pigment in the ink is precipitated or deposited as a solid, causing nozzle clogging of an inkjet head in printing, and so-called printing resumability (intermittent resumability) can decrease.

The inkjet ink according to this embodiment may contain pigments (colorants) other than the above-described specific tar pigment, i.e., Blue No. 1. The pigments other than the Blue No. 1 are not particularly restricted insofar as they are edible. The pigments that can be added to the inkjet ink according to this embodiment can be appropriately selected from conventionally known synthetic food pigments and natural food pigments, for example, and added. When the inkjet ink according to this embodiment also contains the colorants other than the above-described specific tar pigment as the food dye, the total content of the food dyes may be in the range of 1.0 mass % or more and 15.0 mass % or less when only trehalose is contained as the fixing agent and may be in the range of 1.0 mass % or more and 15.0 mass % or less when trehalose and reduced isomaltulose are contained as the fixing agent. Thus, good visibility can be imparted to the printed images while the lightfastness of the inkjet ink is enhanced and sufficient intermittent resumability can be imparted to the inkjet ink.

The synthetic food pigments include tar pigments, natural pigment derivatives, natural synthetic pigments, and the like, for example. The tar pigments include Food Red No. 2, Food Red No. 3, Food Red No. 40, Food Red No. 102, Food Red No. 104, Food Red No. 105, Food Red No. 106, Food Yellow No. 4, Food Yellow No. 5, Food Blue No. 2, Food Red No. 2 Aluminum Lake, Food Red No. 3 Aluminum Lake, Food Red No. 40 Aluminum Lake, Food Yellow No. 4 Aluminum Lake, Food Yellow No. 5 Aluminum Lake, Food Blue No. 1 Aluminum Lake, Food Blue No. 2 Aluminum Lake, and the like, for example. The natural pigment derivatives include norbixin potassium and the like, for example. The natural synthetic pigments include β-carotene, riboflavin, and the like, for example.

The natural food pigments include anthocyanin pigments, carotenoid pigments, quinone pigments, chlorophyll pigments, flavonoid pigments, betaine pigments, monascus pigments, and pigments originating from other natural products, for example. The anthocyanin pigments include a red radish pigment, a red cabbage pigment, a red rice pigment, an elderberry pigment, a cowberry pigment, a gooseberry pigment, a cranberry pigment, a salmonberry pigment, a perilla pigment, a thimbleberry pigment, a strawberry pigment, a dark sweet cherry pigment, a cherry pigment, a hibiscus pigment, a huckleberry pigment, a grape juice pigment, a grape skin pigment, a black currant pigment, a blackberry pigment, a blueberry pigment, a plum pigment, a whortle berry pigment, a boysenberry pigment, a mulberry pigment, a purple potato pigment, a purple corn pigment, a purple yarn pigment, a raspberry pigment, a red currant pigment, a loganberry pigment, and other anthocyanin pigments, for example. The carotenoid pigments include an annatto pigment, a gardenia yellow pigment, and other carotenoid pigments, for example. The quinone pigments include a cochineal pigment, a lithospermum root pigment, a lac pigment, and other quinone pigments, for example. The flavonoid pigments include a safflower yellow pigment, a kaoliang pigment, an onion pigment, and other flavonoid pigments, for example. The betaine pigments include a beet red pigment, for example. The monascus pigments include a monascus pigment and a monascus yellow pigment, for example. The pigments originating from other natural products include a turmeric pigment, a trichotomine pigment, a gardenia red pigment, a spirulina blue pigment, and the like, for example.

(Fixing Agent)

As described above, the inkjet ink according to this embodiment contains the fixing agent for fixing the ink containing the specific tar pigment (Blue No. 1) to the surface of the printing target. Specifically, the fixing agent contained in the inkjet ink according to this embodiment is trehalose. The trehalose is a disaccharide having solubility in 100 ml of 20° C. water of 69 g. The trehalose has solubility in 100 ml of 20° C. water higher than that of other disaccharides, and therefore the addition amount of the trehalose to the solvent containing water can be increased. Therefore, the inkjet ink having the above-described composition can achieve high lightfastness ($\Delta E \leq 25$) even under normal humidity.

In the inkjet ink according to this embodiment, trehalose and reduced isomaltulose may be used in combination as the fixing agent. The reduced isomaltulose is a disaccharide having solubility in 100 ml of 20° C. water of 38 g. The trehalose and the reduced isomaltulose each dissolve easily in different types of solvents. More specifically, the trehalose and the reduced isomaltulose are different in solubility in water and ethanol used as the solvent in the inkjet ink according to this embodiment. Therefore, in this embodiment, the combined use of trehalose and reduced isomaltulose as the fixing agent can increase the maximum dissolution amount (total dissolution amount) in the solvent containing water and ethanol as compared with the case where only trehalose is used as the fixing agent. As a result, with the composition, high lightfastness ($\Delta E \leq 25$) can be achieved even under normal humidity.

When the fixing agent has the composition, the addition of the fixing agent to the inkjet ink together with the solvent having the above-described component composition (water and ethanol) enables the fixation of the ink containing the above-described specific tar pigment to the surface of the printing target. This allows the inkjet ink according to this embodiment to sufficiently suppress the photodiscoloration and/or photofading of the printed images and enhance the lightfastness. Further, the above-described disaccharides (only trehalose or a mixture of trehalose and reduced isomaltulose) used as the fixing agent in this embodiment also have a function of suppressing the decomposition (photolysis) due to the irradiation with light of the inkjet ink. Therefore, the occurrence of the photodiscoloration and/or photofading itself can also be suppressed.

In the inkjet ink according to this embodiment, when only trehalose is contained as the fixing agent, the compounding ratio of the trehalose is preferably in the range of 7.5 mass % or more and 20.0 mass % or less based on the total mass of the ink, more preferably in the range of 7.5 mass % or more and 18.0 mass % or less based on the total mass of the ink, and still more preferably in the range of 7.5 mass % or more and 16.0 mass % or less based on the total mass of the ink.

In the inkjet ink according to this embodiment, when trehalose and reduced isomaltulose are contained as the fixing agent, the compounding ratio of the trehalose is preferably in the range of 2.5 mass % or more and 15.0 mass % or less based on the total mass of the ink, more preferably in the range of 5.0 mass % or more and 15.0 mass % or less based on the total mass of the ink, and still more preferably in the range of 7.5 mass % or more and 15.0 mass % or less based on the total mass of the ink. The compounding ratio of the reduced isomaltulose is preferably 10.0 mass % or less based on the total mass of the ink and more preferably in the range of 8.0 mass % or more and 10.0 mass % or less based on the total mass of the ink.

With such a composition, the ink fixing effect by the above-described disaccharides can be more reliably exhibited, and the lightfastness of the inkjet ink can be reliably enhanced. Further, high intermittent resumability can be imparted to the inkjet ink according to this embodiment.

In contrast thereto, in the case where only trehalose is contained as the fixing agent, when the compounding ratio of the fixing agent is less than 7.5 mass %, the ink fixing effect decreases, making it difficult to obtain lightfastness in some cases. When the compounding ratio of the fixing agent (trehalose) exceeds 20 mass %, the fixing agent in the ink is precipitated or deposited as a solid due to an increase in the ink viscosity or a deterioration of the dissolution stability of the fixing agent, causing nozzle clogging of an inkjet head in printing, and the discharge stability decreases in some cases.

In the case where trehalose and reduced isomaltulose are contained as the fixing agent, when the compounding ratio of the trehalose is less than 2.5 mass %, the ink fixing effect decreases, making it difficult to obtain lightfastness in some cases. When the compounding ratio of the trehalose exceeds 15.0 mass %, the fixing agent in the ink is precipitated or deposited as a solid due to an increase in the ink viscosity or a deterioration of the dissolution stability of the fixing agent, causing nozzle clogging of an inkjet head in printing, and the discharge stability decreases in some cases.

In the case where trehalose and reduced isomaltulose are contained as the fixing agent, when the compounding ratio of the reduced isomaltulose exceeds 10.0 mass %, the fixing agent in the ink is precipitated or deposited as a solid due to an increase in the ink viscosity or a deterioration of the dissolution stability of the fixing agent, causing nozzle clogging of an inkjet head in printing, and the discharge stability decreases in some cases.

When the inkjet ink according to this embodiment contains trehalose and reduced isomaltulose as the fixing agent, the trehalose and the reduced isomaltulose may be contained in a proportion of 7.5 mass % or more in total as the compounding ratio.

With such a composition, the fixing effect of the inkjet ink according to this embodiment can be more reliably exhibited and the lightfastness of the inkjet ink can be reliably enhanced.

The compounding ratio of the trehalose may be larger than the compounding ratio of the reduced isomaltulose.

With such a composition, the ink fixing effect by the above-described disaccharides can be more reliably exhibited and the lightfastness of the inkjet ink can be reliably enhanced.

When the inkjet ink according to this embodiment contains trehalose and reduced isomaltulose as the fixing agent, the compounding ratio of the reduced isomaltulose may be larger than the compounding ratio of the trehalose.

With such a composition, the ink fixing effect by the above-described disaccharides can be more reliably exhibited and the lightfastness of the inkjet ink can be reliably enhanced.

(Solvent)

The inkjet ink according to this embodiment contains, in addition to the above-described specific tar pigment (Blue No. 1) and the above-described fixing agent, the solvent (dispersion medium) to dissolve (disperse) the specific tar pigment and the fixing agent. The inkjet ink according to this embodiment may contain water (e.g., purified water) and ethanol as the solvent.

In general, the saccharides have the property of hardly dissolving in alcohols. Therefore, in this embodiment, the ethanol contained as the solvent reduces the solubility in the solvent of the above-described disaccharides used as the fixing agent. Thus, by adding the solvent containing the above-described alcohols (ethanol) to the inkjet ink together with the above-described disaccharides (only trehalose or a mixture of trehalose and reduced isomaltulose) as the fixing agent in this embodiment, the ink fixing effect is reliably exhibited, and the above-described specific tar pigment (Blue No. 1 in this example) contained in the ink can be allowed to remain at a higher density on the surface of the printing target (e.g., tablet). Thus, the inkjet ink according to this embodiment can sufficiently suppress the photodiscoloration and/or photofading of the printed images and enhance the lightfastness.

The inkjet ink according to this embodiment may further contain propylene glycol (PG) as the solvent. The propylene glycol can function as a wetting agent to prevent the ink from drying at inkjet nozzles and impart sufficient intermittent resumability to the ink. The ethanol has high volatility, and thus can enhance the transfer resistance (drying properties) of the inkjet ink.

The compounding ratio of each component of the above-described solvent in the inkjet ink according to this embodiment is not limited. The compounding ratio of the ethanol, i.e., the addition amount of the ethanol, is preferably in the range of 11.5 mass % or more and 40 mass % or less based on the total mass of the ink. With such a composition, the solubility of the fixing agent in the solvent reliably decreases, and the fixing effect of the ink containing the above-described specific tar pigment is further enhanced. Therefore, more excellent lightfastness can be imparted to the inkjet ink.

Meanwhile, when the addition amount of the ethanol is less than 11.5 mass %, the drying of the printed surface on the tablet surface is further delayed, sometimes causing a defect in which, when printed tablets are brought into contact with each other, undried ink adheres to other tablets and causes staining (poor transfer). Meanwhile, when the addition amount of the ethanol exceeds 40 mass %, the drying of the ink at ink jet nozzles occurs, causing nozzle clogging of an inkjet head in printing, and the intermittent resumability can decrease.

When the inkjet ink according to this embodiment contains propylene glycol in the solvent, the compounding ratio of the propylene glycol, i.e., the addition amount of the propylene glycol, is preferably in the range of 0 masse or more and 40 mass % or less based on the total mass of the ink. With such a composition, the solubility of the fixing agent in the solvent reliably decreases, and the fixing effect of the ink containing the above-described specific tar pigment is further enhanced. Therefore, more excellent lightfastness can be imparted to the inkjet ink. The addition amount of the propylene glycol is preferably 10 mass % or more. Thus, the solubility of the fixing agent in the solvent reliably decreases, and the fixing effect of the ink containing the above-described specific tar pigment is further enhanced. Therefore, more excellent lightfastness can be imparted to the inkjet ink.

When the addition amount of the propylene glycol exceeds 28 mass %, the drying of the printed surface on the tablet surface is further delayed, sometimes causing a defect in which, when printed tablets are brought into contact with each other, undried ink adheres to other tablets and causes staining (poor transfer).

The inkjet ink according to this embodiment may further contain at least one of glycerol and isopropyl alcohol as the solvent. Specifically, the above-described solvent may further contain either glycerol or isopropyl alcohol or may further contain both glycerol and isopropyl alcohol. The glycerol functions as a wetting agent as with the propylene glycol described above. Further, the isopropyl alcohol has high volatility as with the ethanol described above, and therefore can enhance the transfer resistance (drying properties) of the inkjet ink. By further adding glycerol and isopropyl alcohol to the solvent in addition to the above-described components, the lightfastness of the inkjet ink can be further enhanced and the performance corresponding to each component can be imparted to the inkjet ink. Due to the fact that the solvent further contains the components, the solubility of the fixing agent in the solvent more reliably decreases, and the fixing effect of the ink containing the above-described specific tar pigment can be further enhanced.

(Internal-Sizing Resin)

The inkjet ink according to this embodiment may contain an internal-sizing resin in addition to the pigment and the solvent described above. The internal-sizing resin that can be added to the inkjet ink according to this embodiment may be an edible resin-like substance in the form of a water-soluble powder, a paste, or flakes capable of forming a coating film on the surface of a tablet when dried after printing. The internal-sizing resin includes polyvinyl alcohol (PVA), hydroxypropyl cellulose (HPC), hydroxypropyl methylcellulose (HPMC), polyvinylpyrrolidone (PVP), high molecular weight polyethylene glycol (PEG), such as polyethylene glycol 4000/polyethylene glycol 1540, shellac resin, a methacrylic acid copolymer (product name: Eudragit S100), maltodextrin, erythritol, and the like, for example.

(Leveling Agent)

The inkjet ink according to this embodiment may contain a leveling agent in addition to the pigment and the solvent or the internal-sizing resin described above. The leveling agent that can be added to the inkjet ink according to this embodiment may be an edible and water-soluble surfactant. The leveling agent includes polyglycerol fatty acid ester (e.g., Decaglycerol distearate Q-182S or Decaglycerol monolaurate Q-12S manufactured by Taiyo Kagaku Co., Ltd.), sorbitan fatty acid ester (e.g., NIKKOLSL-10 manufactured by Nikko Chemicals Co., Ltd.), sucrose fatty acid ester (e.g., DK Ester F-110 manufactured by DKS Co. Ltd.), polysorbate (Emazole S-120 series manufactured by Kao Corporation), and the like, for example.

[Printing Method]

The inkjet ink according to this embodiment is not particularly limited in a printing method, and is applicable to printing using an inkjet device, such as a commercially available inkjet printer. Therefore, the inkjet ink according to this embodiment has a wide range of applications and is very useful. For example, the inkjet ink according to this embodiment can be printed using a so-called drop-on-demand inkjet device including a piezoelectric element (piezoelectric ceramic) as an actuator or can be printed also using inkjet devices of other types.

The drop-on-demand inkjet device includes a device adopting a thermal-inkjet system of discharging an inkjet ink using steam pressure generated by instantaneously heating a micro-heating element to a high temperature (200 to 300° C.), an electrostatic type device discharging an inkjet ink by electrostatically vibrating an actuator, a device adopting an ultrasonic system utilizing an ultrasonic cavitation phenomenon, and the like, for example. When the inkjet ink according to this embodiment has charging performance, a device adopting a continuous ejection system can also be utilized.

[Tablet]

In this embodiment, the inkjet ink according to this embodiment may be used for printing characters or images on the surfaces of tablets, for example, using the printing methods described above. More specifically, the tablet according to this embodiment may include printed parts, i.e., printed images, printed using the inkjet ink according to this embodiment. Insofar as the inkjet ink according to this embodiment is used, the lightfastness of the printed images (e.g., printed images 3) provided on the surfaces of medicine tablets using the inkjet printing methods can be enhanced.

Hereinafter, the composition of the tablet including the printed images printed with the inkjet ink according to this embodiment is described.

The tablet according to this embodiment is, for example, a medicine tablet. Herein, the "medicine tablet" includes film-coated tablets having an outermost surface on which a water-soluble surface layer is formed besides uncoated tablets (bare tablets), sugarcoated tablets, enteric tablets, orally disintegrating tablets, and the like, for example.

Figure 2:
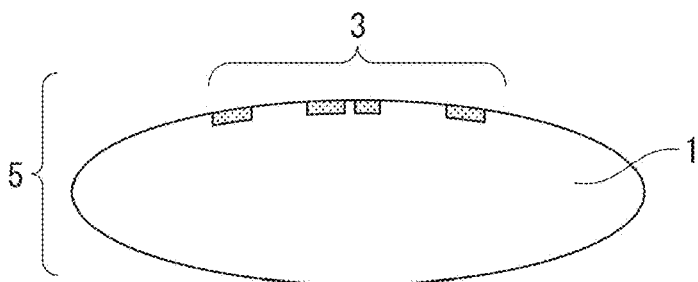
FIG. 2 is a schematic cross-sectional view illustrating one example of a tablet (uncoated tablet) according to the embodiment of the present invention.

FIG. 2 is a schematic cross-sectional view illustrating one example of a medicine tablet (uncoated tablet) provided with printing (characters or images). FIG. 2 illustrates uncoated tablet printed matter 5, in cross-sectional view, with the printed images 3, such as characters, printed on the upper surface of the substrate 1 of the tablet.

Figure 3:
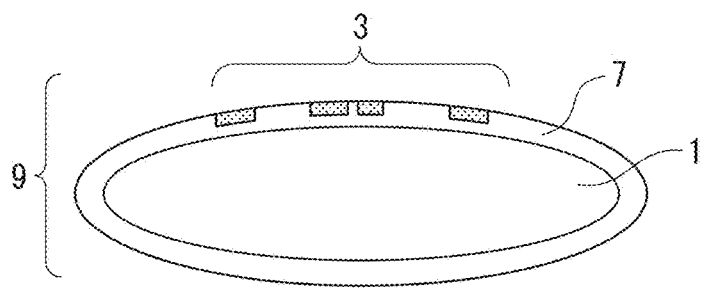
FIG. 3 is a schematic cross-sectional view illustrating one example of a tablet (film-coated tablet) according to the embodiment of the present invention.

FIG. 3 is a schematic cross-sectional view illustrating one example of a medicine tablet (film-coated tablet) provided with printing (characters or images). FIG. 3 illustrates film-coated tablet printed matter 9, in cross-sectional view, with the printed images 3, such as characters, printed on the upper surface of the substrate 1 of the tablet, on the surface of which a film coating layer 7 is formed.

Figure 4:
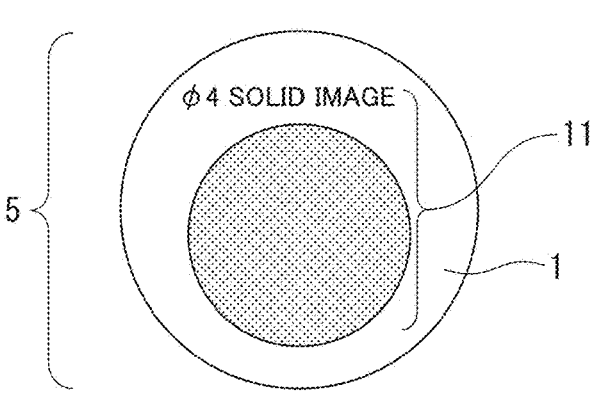
FIG. 4 is one example of a printed image of the tablet (uncoated tablet) according to the embodiment of the present invention.
Figure 5:
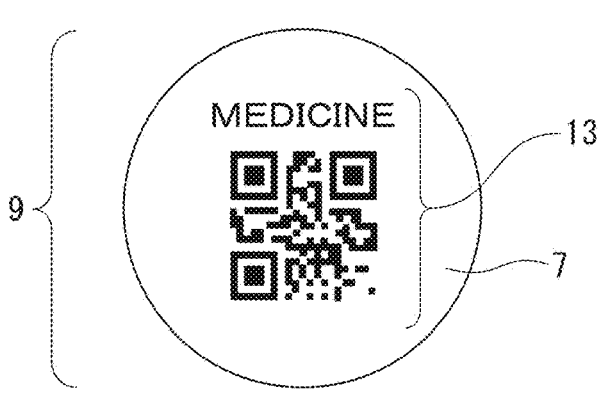
FIG. 5 is one example of a printed image of the tablet (film-coated tablet) according to the embodiment of the present invention.

In this embodiment, a solid image may be printed as an uncoated tablet printed image 11 as illustrated in FIG. 4, or a two-dimensional barcode may be printed as a film-coated tablet printed image 13 as illustrated in FIG. 5.

The medicine tablet contains active ingredients without being particularly limited. The active ingredients include, but are not limited to, substances effective for preventing or treating various diseases (e.g., substances having a sleep-inducing effect, tranquilizer activity, antibacterial activity, antihypertensive effect, anti-angina activity, analgesic effect, anti-inflammatory activity, tranquilizing effect, diabetes treatment activity, diuretic effect, anticholinergic activity, anti-hyperacidity effect, antiepileptic effect, ACE inhibitory activity, β-receptor antagonist or agonist activity, anesthetic action, appetite suppressant action, antiarrhythmic effect, antidepressant effect, anticoagulant activity, antidiarrheal effect, antihistamine activity, antimalarial effect, antitumor activity, immunosuppressive activity, antiparkinsonian effect, antipsychotic effect, antiplatelet activity, antihyperlipidemic effect, and the like), substances having a cleaning effect, substances having a scent or a deodorant action, and the like, for example.

In the tablet according to this embodiment, carriers acceptable for the intended use can be compounded as required together with the active ingredients. For example, medicine tablets can be compounded with pharmaceutically acceptable carriers. As the pharmaceutically acceptable carriers, various organic or inorganic carrier substances, which are commonly used as formulation materials, are used. For example, an appropriate amount of excipients, lubricants, binders, disintegrants, thickeners, and the like are compounded as appropriate. Further, additives, such as antiseptics, antioxidants, coloring agents, and sweeteners, are also usable as required.

Although this embodiment is described taking the medicine tablet as an example of the tablet, the tablets are not limited to the tablets of the present invention. The printing targets of the inkjet ink according to this embodiment are not particularly restricted. For example, the inkjet ink according to this embodiment may be printed on the surfaces of various tablets, such as tablets to be administered to non-human animals (pets, livestock, poultry, and the like), or tablets of feed, fertilizers, cleaning agents, and food tablets, such as confectionery tablets, e.g., soda-pop candy, and supplement tablets. The inkjet ink according to this embodiment is not particularly restricted in the size of the printing target, and is applicable to tablets of various sizes.

Advantageous Effects of this Embodiment (1) The inkjet ink according to this embodiment contains: Blue No. 1 as the food dye; only trehalose as the fixing agent; and water and ethanol as the solvent, in which the compounding ratio of the trehalose is in the range of 7.5 mass % or more and 20.0 mass % or less based on the total mass of the inkjet ink.

With such a composition, the photodiscoloration and/or photofading of the printed images printed using the specific colorant can be sufficiently suppressed and excellent lightfastness can be imparted to the inkjet ink as compared with conventional technologies.

(2) The inkjet ink according to this embodiment contains: Blue No. 1 as the food dye; trehalose and reduced isomaltulose as the fixing agent; and water and ethanol as the solvent, in which the compounding ratio of the trehalose is in the range of 2.5 mass % or more and 15.0 mass % or less based on the total mass of the inkjet ink and the compounding ratio of the reduced isomaltulose is 10.0 mass % or less based on the total mass of the inkjet ink.

With such a composition, the photodiscoloration and/or photofading of the printed images printed using the specific colorant can be sufficiently suppressed and excellent lightfastness can be imparted to the inkjet ink as compared with conventional technologies.

(3) In the inkjet ink according to this embodiment, when only trehalose is contained as the fixing agent, the compounding ratio of the Blue No. 1 may be in the range of 1.0 mass % or more and 15.0 mass % or less based on the total mass of the inkjet ink.

With such a composition, high visibility and intermittent resumability can be imparted to the inkjet ink while excellent lightfastness is imparted to the inkjet ink as compared with conventional technologies.

(4) In the inkjet ink according to this embodiment, when trehalose and reduced isomaltulose are contained as the fixing agent, the compounding ratio of the Blue No. 1 may be in the range of 1.0 mass % or more and 15.0 mass % or less based on the total mass of the inkjet ink.

With such a composition, high visibility and intermittent resumability can be imparted to the inkjet ink while excellent lightfastness is imparted to the inkjet ink as compared with conventional technologies.

(5) The tablet printed matter according to this embodiment includes the printed images (one example of the printed parts) 3 printed with the inkjet ink described above.

With such a composition, the photodiscoloration and/or photofading in the printed images 3 and the like directly printed on the surface or the like of the tablet can be sufficiently suppressed and the lightfastness of the printed images 3 and the like can be sufficiently enhanced. Further, edibility can be imparted also to a printed image portion printed on the surface of the tablet.

EXAMPLES

Hereinafter, the present invention is described in more detail with reference to Examples but the present invention is not limited to Examples.

Examples 1 to 63 and Comparative Examples 1 to 4

Hereinafter, a procedure of preparing an inkjet ink according to each of Examples 1 to 63 and Comparative Examples 1 to 4 is described.

(Production of Inkjet Ink)

First, a printing ink was prepared. An inkjet ink contains components, such as a pigment (colorant), a solvent, and a fixing agent (fading inhibitor). As the preparation procedure, first, a fixing agent was added to a solvent to give a transparent base liquid. Subsequently, a food dye was added to the transparent base liquid. Thus, an ink according to this example was prepared. Hereinafter, the individual components are specifically described.

In this example, purified water (ion-exchanged water), propylene glycol, and ethanol were individually used as required for the solvent. Specifically, propylene glycol and ethanol were added to purified water, and the mixture was thoroughly stirred to give a solvent (mixed solvent). Trehalose and reduced isomaltulose were added, as required, as the fixing agent (fading inhibitor) to the solvent above, and the mixture was stirred for about 1 hour to give a transparent base liquid. Blue No. 1, Red No. 3, Red No. 102, and Yellow No. 4, which are the food dyes, were added, as required, as the colorant to the transparent base liquid above to give an inkjet ink of each of Examples 1 to 63 and Comparative Examples 1 to 4.

Sample 1 (Comparative Example 1)

Based on the whole inkjet ink of Sample 1 (Comparative Example 1), the compounding ratio of the Blue No. 1, which is the colorant, was set to 1.5 mass %, the compounding ratio of the purified water among the solvents was set to 49.0 mass %, the compounding ratio of the ethanol among the solvents was set to 11.5 mass %, the compounding ratio of the propylene glycol (PG) among the solvents was set to 28.0 mass %, and the compounding ratio of the reduced isomaltulose, which is the fixing agent (fading inhibitor), was set to 10.0 mass %.

Thus, the inkjet ink of Sample 1 (Comparative Example 1) was obtained.

Sample 2 (Example 1)

Based on the whole inkjet ink of Sample 2 (Example 1), the compounding ratio of the Blue No. 1, which is the colorant, was set to 1.5 mass %, the compounding ratio of the purified water among the solvents was set to 51.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 2.5 mass %, and the compounding ratio of the reduced isomaltulose, which is the fixing agent (fading inhibitor), was set to 5.0 mass %.

Thus, the inkjet ink of Sample 2 (Example 1) was obtained.

Sample 3 (Example 2)

Based on the whole inkjet ink of Sample 3 (Example 2), the compounding ratio of the Blue No. 1, which is the colorant, was set to 1.5 mass %, the compounding ratio of the purified water among the solvents was set to 50.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 2.5 mass %, and the compounding ratio of the reduced isomaltulose, which is the fixing agent (fading inhibitor), was set to 6.0 mass %.

Thus, the inkjet ink of Sample 3 (Example 2) was obtained.

Sample 4 (Example 3)

Based on the whole inkjet ink of Sample 4 (Example 3), the compounding ratio of the Blue No. 1, which is the colorant, was set to 1.5 mass %, the compounding ratio of the purified water among the solvents was set to 48.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 2.5 mass %, and the compounding ratio of the reduced isomaltulose, which is the fixing agent (fading inhibitor), was set to 8.0 mass %.

Thus, the inkjet ink of Sample 4 (Example 3) was obtained.

Sample 5 (Example 4)

Based on the whole inkjet ink of Sample 5 (Example 4), the compounding ratio of the Blue No. 1, which is the colorant, was set to 1.5 mass %, the compounding ratio of the purified water among the solvents was set to 46.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 2.5 mass %, and the compounding ratio of the reduced isomaltulose, which is the fixing agent (fading inhibitor), was set to 10.0 mass %.

Thus, the inkjet ink of Sample 5 (Example 4) was obtained.

Sample 6 (Example 5)

Based on the whole inkjet ink of Sample 6 (Example 5), the compounding ratio of the Blue No. 1, which is the colorant, was set to 1.5 mass %, the compounding ratio of the purified water among the solvents was set to 44.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 5.0 mass %, and the compounding ratio of the reduced isomaltulose, which is the fixing agent (fading inhibitor), was set to 10.0 mass %.

Thus, the inkjet ink of Sample 6 (Example 5) was obtained.

Sample 7 (Example 6)

Based on the whole inkjet ink of Sample 7 (Example 6), the compounding ratio of the Blue No. 1, which is the colorant, was set to 1.5 mass %, the compounding ratio of the purified water among the solvents was set to 41.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 7.5 mass %, and the compounding ratio of the reduced isomaltulose, which is the fixing agent (fading inhibitor), was set to 10.0 mass %.

Thus, the inkjet ink of Sample 7 (Example 6) was obtained.

Sample 8 (Example 7)

Based on the whole inkjet ink of Sample 8 (Example 7), the compounding ratio of the Blue No. 1, which is the colorant, was set to 1.5 mass %, the compounding ratio of the purified water among the solvents was set to 39.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 10.0 mass %.

Thus, the inkjet ink of Sample 8 (Example 7) was obtained.

Sample 9 (Example 8)

Based on the whole inkjet ink of Sample 9 (Example 8), the compounding ratio of the Blue No. 1, which is the colorant, was set to 1.5 mass %, the compounding ratio of the purified water among the solvents was set to 36.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 13.0 mass %, and the compounding ratio of the reduced isomaltulose, which is the fixing agent (fading inhibitor), was set to 10.0 mass %.

Thus, the inkjet ink of Sample 9 (Example 8) was obtained.

Sample 10 (Example 9)

Based on the whole inkjet ink of Sample 10 (Example 9), the compounding ratio of the Blue No. 1, which is the colorant, was set to 1.5 mass %, the compounding ratio of the Red No. 3, which is the colorant, was set to 0.5 mass %, the compounding ratio of the Red No. 102, which is the colorant, was set to 0.5 mass %, the compounding ratio of the Yellow No. 4, which is the colorant, was set to 0.5 mass %, the compounding ratio of the purified water among the solvents was set to 34.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 13.0 mass %, and the compounding ratio of the reduced isomaltulose, which is the fixing agent (fading inhibitor), was set to 10.0 mass %.

Thus, the inkjet ink of Sample 10 (Example 9) was obtained.

Sample 11 (Example 10)

Based on the whole inkjet ink of Sample 11 (Example 10), the compounding ratio of the Blue No. 1, which is the colorant, was set to 1.5 mass %, the compounding ratio of the purified water among the solvents was set to 35.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 14.0 mass %, and the compounding ratio of the reduced isomaltulose, which is the fixing agent (fading inhibitor), was set to 10.0 mass %.

Thus, the inkjet ink of Sample 11 (Example 10) was obtained.

Sample 12 (Example 11)

Based on the whole inkjet ink of Sample 12 (Example 11), the compounding ratio of the Blue No. 1, which is the colorant, was set to 1.5 mass %, the compounding ratio of the purified water among the solvents was set to 34.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 15.0 mass %, and the compounding ratio of the reduced isomaltulose, which is the fixing agent (fading inhibitor), was set to 10.0 mass %.

Thus, the inkjet ink of Sample 12 (Example 11) was obtained.

Sample 13 (Comparative Example 2)

Based on the whole inkjet ink of Sample 13 (Comparative Example 2), the compounding ratio of the Blue No. 1, which is the colorant, was set to 1.5 mass %, the compounding ratio of the purified water among the solvents was set to 32.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 17.0 mass %, and the compounding ratio of the reduced isomaltulose, which is the fixing agent (fading inhibitor), was set to 10.0 mass %.

Thus, the inkjet ink of Sample 13 (Comparative Example 2) was obtained.

Sample 14 (Comparative Example 3)

Based on the whole inkjet ink of Sample 14 (Comparative Example 3), the compounding ratio of the Blue No. 1, which is the colorant, was set to 3.0 mass %, the compounding ratio of the purified water among the solvents was set to 52.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 5.0 mass %.

Thus, the inkjet ink of Sample 14 (Comparative Example 3) was obtained.

Sample 15 (Example 12)

Based on the whole inkjet ink of Sample 15 (Example 12), the compounding ratio of the Blue No. 1, which is the colorant, was set to 5.0 mass %, the compounding ratio of the purified water among the solvents was set to 48.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 7.5 mass %.

Thus, the inkjet ink of Sample 15 (Example 12) was obtained.

Sample 16 (Example 13)

Based on the whole inkjet ink of Sample 16 (Example 13), the compounding ratio of the Blue No. 1, which is the colorant, was set to 5.0 mass %, the compounding ratio of the purified water among the solvents was set to 45.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 10.0 mass %.

Thus, the inkjet ink of Sample 16 (Example 13) was obtained.

Sample 17 (Example 14)

Based on the whole inkjet ink of Sample 17 (Example 14), the compounding ratio of the Blue No. 1, which is the colorant, was set to 3.0 mass %, the compounding ratio of the purified water among the solvents was set to 45.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 12.0 mass %.

Thus, the inkjet ink of Sample 17 (Example 14) was obtained.

Sample 18 (Example 15)

Based on the whole inkjet ink of Sample 18 (Example 15), the compounding ratio of the Blue No. 1, which is the colorant, was set to 3.0 mass %, the compounding ratio of the purified water among the solvents was set to 42.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 15.0 mass %.

Thus, the inkjet ink of Sample 18 (Example 15) was obtained.

Sample 19 (Example 16)

Based on the whole inkjet ink of Sample 19 (Example 16), the compounding ratio of the Blue No. 1, which is the colorant, was set to 1.5 mass %, the compounding ratio of the purified water among the solvents was set to 43.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 16.0 mass %.

Thus, the inkjet ink of Sample 19 (Example 16) was obtained.

Sample 20 (Example 17)

Based on the whole inkjet ink of Sample 20 (Example 17), the compounding ratio of the Blue No. 1, which is the colorant, was set to 1.5 mass %, the compounding ratio of the purified water among the solvents was set to 41.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 18.0 mass %.

Thus, the inkjet ink of Sample 20 (Example 17) was obtained.

Sample 21 (Example 18)

Based on the whole inkjet ink of Sample 21 (Example 18), the compounding ratio of the Blue No. 1, which is the colorant, was set to 1.5 mass %, the compounding ratio of the Red No. 3, which is the colorant, was set to 0.5 mass %, the compounding ratio of the Red No. 102, which is the colorant, was set to 0.5 mass %, the compounding ratio of the Yellow No. 4, which is the colorant, was set to 0.5 mass %, the compounding ratio of the purified water among the solvents was set to 39.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 18.0 mass %.

Thus, the inkjet ink of Sample 21 (Example 18) was obtained.

Sample 22 (Example 19)

Based on the whole inkjet ink of Sample 22 (Example 19), the compounding ratio of the Blue No. 1, which is the colorant, was set to 1.5 mass %, the compounding ratio of the purified water among the solvents was set to 39.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 20.0 mass %.

Thus, the inkjet ink of Sample 22 (Example 19) was obtained.

Sample 23 (Comparative Example 4)

Based on the whole inkjet ink of Sample 23 (Comparative Example 4), the compounding ratio of the Blue No. 1, which is the colorant, was set to 1.5 mass %, the compounding ratio of the purified water among the solvents was set to 37.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 22.0 mass %.

Thus, the inkjet ink of Sample 23 (Comparative Example 4) was obtained.

Sample 24 (Example 20)

Based on the whole inkjet ink of Sample 24 (Example 20), the compounding ratio of the Blue No. 1, which is the colorant, was set to 0.7 mass %, the compounding ratio of the purified water among the solvents was set to 35.8 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 15.0 mass %, and the compounding ratio of the reduced isomaltulose, which is the fixing agent (fading inhibitor), was set to 9.0 mass %.

Thus, the inkjet ink of Sample 24 (Example 20) was obtained.

Sample 25 (Example 21)

Based on the whole inkjet ink of Sample 25 (Example 21), the compounding ratio of the Blue No. 1, which is the colorant, was set to 1.0 mass %, the compounding ratio of the purified water among the solvents was set to 35.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 15.0 mass %, and the compounding ratio of the reduced isomaltulose, which is the fixing agent (fading inhibitor), was set to 9.0 mass %.

Thus, the inkjet ink of Sample 25 (Example 21) was obtained.

Sample 26 (Example 22)

Based on the whole inkjet ink of Sample 26 (Example 22), the compounding ratio of the Blue No. 1, which is the colorant, was set to 1.2 mass %, the compounding ratio of the purified water among the solvents was set to 35.3 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 15.0 mass %, and the compounding ratio of the reduced isomaltulose, which is the fixing agent (fading inhibitor), was set to 9.0 mass %.

Thus, the inkjet ink of Sample 26 (Example 22) was obtained.

Sample 27 (Example 23)

Based on the whole inkjet ink of Sample 27 (Example 23), the compounding ratio of the Blue No. 1, which is the colorant, was set to 1.5 mass %, the compounding ratio of the purified water among the solvents was set to 40.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 9.0 mass %.

Thus, the inkjet ink of Sample 27 (Example 23) was obtained.

Sample 28 (Example 24)

Based on the whole inkjet ink of Sample 28 (Example 24), the compounding ratio of the Blue No. 1, which is the colorant, was set to 2.0 mass %, the compounding ratio of the purified water among the solvents was set to 39.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 9.0 mass %.

Thus, the inkjet ink of Sample 28 (Example 24) was obtained.

Sample 29 (Example 25)

Based on the whole inkjet ink of Sample 29 (Example 25), the compounding ratio of the Blue No. 1, which is the colorant, was set to 2.0 mass %, the compounding ratio of the Red No. 3, which is the colorant, was set to 0.5 mass %, the compounding ratio of the Red No. 102, which is the colorant, was set to 0.5 mass %, the compounding ratio of the Yellow No. 4, which is the colorant, was set to 0.5 mass %, the compounding ratio of the purified water among the solvents was set to 38.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 9.0 mass %.

Thus, the inkjet ink of Sample 29 (Example 25) was obtained.

Sample 30 (Example 26)

Based on the whole inkjet ink of Sample 30 (Example 26), the compounding ratio of the Blue No. 1, which is the colorant, was set to 3.5 mass %, the compounding ratio of the purified water among the solvents was set to 38.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 9.0 mass %.

Thus, the inkjet ink of Sample 30 (Example 26) was obtained.

Sample 31 (Example 27)

Based on the whole inkjet ink of Sample 31 (Example 27), the compounding ratio of the Blue No. 1, which is the colorant, was set to 4.5 mass %, the compounding ratio of the purified water among the solvents was set to 42.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 5.0 mass %, and the compounding ratio of the reduced isomaltulose, which is the fixing agent (fading inhibitor), was set to 9.0 mass %.

Thus, the inkjet ink of Sample 31 (Example 27) was obtained.

Sample 32 (Example 28)

Based on the whole inkjet ink of Sample 32 (Example 28), the compounding ratio of the Blue No. 1, which is the colorant, was set to 5.0 mass %, the compounding ratio of the purified water among the solvents was set to 41.5 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 5.0 mass %, and the compounding ratio of the reduced isomaltulose, which is the fixing agent (fading inhibitor), was set to 9.0 mass %.

Thus, the inkjet ink of Sample 32 (Example 28) was obtained.

Sample 33 (Example 29)

Based on the whole inkjet ink of Sample 33 (Example 29), the compounding ratio of the Blue No. 1, which is the colorant, was set to 10.0 mass %, the compounding ratio of the purified water among the solvents was set to 43.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 2.5 mass %, and the compounding ratio of the reduced isomaltulose, which is the fixing agent (fading inhibitor), was set to 5.0 mass %.

Thus, the inkjet ink of Sample 33 (Example 29) was obtained.

Sample 34 (Example 30)

Based on the whole inkjet ink of Sample 34 (Example 30), the compounding ratio of the Blue No. 1, which is the colorant, was set to 15.0 mass %, the compounding ratio of the purified water among the solvents was set to 38.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 2.5 mass %, and the compounding ratio of the reduced isomaltulose, which is the fixing agent (fading inhibitor), was set to 5.0 mass %.

Thus, the inkjet ink of Sample 34 (Example 30) was obtained.

Sample 35 (Example 31)

Based on the whole inkjet ink of Sample 35 (Example 31), the compounding ratio of the Blue No. 1, which is the colorant, was set to 17.0 mass %, the compounding ratio of the purified water among the solvents was set to 36.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 2.5 mass %, and the compounding ratio of the reduced isomaltulose, which is the fixing agent (fading inhibitor), was set to 5.0 mass %.

Thus, the inkjet ink of Sample 35 (Example 31) was obtained.

Sample 36 (Example 32)

Based on the whole inkjet ink of Sample 36 (Example 32), the compounding ratio of the Blue No. 1, which is the colorant, was set to 0.7 mass %, the compounding ratio of the purified water among the solvents was set to 39.8 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 20.0 mass %.

Thus, the inkjet ink of Sample 36 (Example 32) was obtained.

Sample 37 (Example 33)

Based on the whole inkjet ink of Sample 37 (Example 33), the compounding ratio of the Blue No. 1, which is the colorant, was set to 1.0 mass %, the compounding ratio of the purified water among the solvents was set to 39.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 20.0 mass %.

Thus, the inkjet ink of Sample 37 (Example 33) was obtained.

Sample 38 (Example 34)

Based on the whole inkjet ink of Sample 38 (Example 34), the compounding ratio of the Blue No. 1, which is the colorant, was set to 1.2 mass %, the compounding ratio of the purified water among the solvents was set to 39.3 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 20.0 mass %.

Thus, the inkjet ink of Sample 38 (Example 34) was obtained.

Sample 39 (Example 35)

Based on the whole inkjet ink of Sample 39 (Example 35), the compounding ratio of the Blue No. 1, which is the colorant, was set to 1.5 mass %, the compounding ratio of the purified water among the solvents was set to 39.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 20.0 mass %.

Thus, the inkjet ink of Sample 39 (Example 35) was obtained.

Sample 40 (Example 36)

Based on the whole inkjet ink of Sample 40 (Example 36), the compounding ratio of the Blue No. 1, which is the colorant, was set to 2.0 mass %, the compounding ratio of the purified water among the solvents was set to 38.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 20.0 mass %.

Thus, the inkjet ink of Sample 40 (Example 36) was obtained.

Sample 41 (Example 37)

Based on the whole inkjet ink of Sample 41 (Example 37), the compounding ratio of the Blue No. 1, which is the colorant, was set to 3.5 mass %, the compounding ratio of the purified water among the solvents was set to 41.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 16.0 mass %.

Thus, the inkjet ink of Sample 41 (Example 37) was obtained.

Sample 42 (Example 38)

Based on the whole inkjet ink of Sample 42 (Example 38), the compounding ratio of the Blue No. 1, which is the colorant, was set to 4.5 mass %, the compounding ratio of the purified water among the solvents was set to 40.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 16.0 mass %.

Thus, the inkjet ink of Sample 42 (Example 38) was obtained.

Sample 43 (Example 39)

Based on the whole inkjet ink of Sample 43 (Example 39), the compounding ratio of the Blue No. 1, which is the colorant, was set to 4.5 mass %, the compounding ratio of the Red No. 3, which is the colorant, was set to 0.5 mass %, the compounding ratio of the Red No. 102, which is the colorant, was set to 0.5 mass %, the compounding ratio of the Yellow No. 4, which is the colorant, was set to 0.5 mass %, the compounding ratio of the purified water among the solvents was set to 39.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 15.0 mass %.

Thus, the inkjet ink of Sample 43 (Example 39) was obtained.

Sample 44 (Example 40)

Based on the whole inkjet ink of Sample 44 (Example 40), the compounding ratio of the Blue No. 1, which is the colorant, was set to 5.0 mass %, the compounding ratio of the purified water among the solvents was set to 40.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 15.0 mass %.

Thus, the inkjet ink of Sample 44 (Example 40) was obtained.

Sample 45 (Example 41)

Based on the whole inkjet ink of Sample 45 (Example 41), the compounding ratio of the Blue No. 1, which is the colorant, was set to 10.0 mass %, the compounding ratio of the purified water among the solvents was set to 40.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 10.0 mass %.

Thus, the inkjet ink of Sample 45 (Example 41) was obtained.

Sample 46 (Example 42)

Based on the whole inkjet ink of Sample 46 (Example 42), the compounding ratio of the Blue No. 1, which is the colorant, was set to 15.0 mass %, the compounding ratio of the purified water among the solvents was set to 37.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 8.0 mass %.

Thus, the inkjet ink of Sample 46 (Example 42) was obtained.

Sample 47 (Example 43)

Based on the whole inkjet ink of Sample 47 (Example 43), the compounding ratio of the Blue No. 1, which is the colorant, was set to 17.0 mass %, the compounding ratio of the purified water among the solvents was set to 35.5 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 8.0 mass %.

Thus, the inkjet ink of Sample 47 (Example 43) was obtained.

Sample 48 (Example 44)

Based on the whole inkjet ink of Sample 48 (Example 44), the compounding ratio of the Blue No. 1, which is the colorant, was set to 3.5 mass %, the compounding ratio of the purified water among the solvents was set to 59.0 mass %, the compounding ratio of the ethanol among the solvents was set to 11.5 mass %, the compounding ratio of the propylene glycol (PG) among the solvents was set to 10.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 48 (Example 44) was obtained.

Sample 49 (Example 45)

Based on the whole inkjet ink of Sample 49 (Example 45), the compounding ratio of the Blue No. 1, which is the colorant, was set to 3.5 mass %, the compounding ratio of the purified water among the solvents was set to 50.5 mass %, the compounding ratio of the ethanol among the solvents was set to 20.0 mass %, the compounding ratio of the propylene glycol (PG) among the solvents was set to 10.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 49 (Example 45) was obtained.

Sample 50 (Example 46)

Based on the whole inkjet ink of Sample 50 (Example 46), the compounding ratio of the Blue No. 1, which is the colorant, was set to 3.5 mass %, the compounding ratio of the Red No. 3, which is the colorant, was set to 0.5 mass %, the compounding ratio of the Red No. 102, which is the colorant, was set to 0.5 mass %, the compounding ratio of the Yellow No. 4, which is the colorant, was set to 0.5 mass %, the compounding ratio of the purified water among the solvents was set to 49.0 mass %, the compounding ratio of the ethanol among the solvents was set to 20.0 mass %, the compounding ratio of the propylene glycol (PG) among the solvents was set to 10.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 50 (Example 46) was obtained.

Sample 51 (Example 47)

Based on the whole inkjet ink of Sample 51 (Example 47), the compounding ratio of the Blue No. 1, which is the colorant, was set to 3.5 mass %, the compounding ratio of the purified water among the solvents was set to 40.5 mass %, the compounding ratio of the ethanol among the solvents was set to 30.0 mass %, the compounding ratio of the propylene glycol (PG) among the solvents was set to 10.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 51 (Example 47) was obtained.

Sample 52 (Example 48)

Based on the whole inkjet ink of Sample 52 (Example 48), the compounding ratio of the Blue No. 1, which is the colorant, was set to 3.5 mass %, the compounding ratio of the purified water among the solvents was set to 30.5 mass %, the compounding ratio of the ethanol among the solvents was set to 40.0 mass %, the compounding ratio of the propylene glycol (PG) among the solvents was set to 10.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 52 (Example 48) was obtained.

Sample 53 (Example 49)

Based on the whole inkjet ink of Sample 53 (Example 49), the compounding ratio of the Blue No. 1, which is the colorant, was set to 3.5 mass %, the compounding ratio of the purified water among the solvents was set to 69.0 mass %, the compounding ratio of the ethanol among the solvents was set to 11.5 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 53 (Example 49) was obtained.

Sample 54 (Example 50)

Based on the whole inkjet ink of Sample 54 (Example 50), the compounding ratio of the Blue No. 1, which is the colorant, was set to 3.5 mass %, the compounding ratio of the Red No. 3, which is the colorant, was set to 0.5 mass %, the compounding ratio of the Red No. 102, which is the colorant, was set to 0.5 mass %, the compounding ratio of the Yellow No. 4, which is the colorant, was set to 0.5 mass %, the compounding ratio of the purified water among the solvents was set to 67.5 mass %, the compounding ratio of the ethanol among the solvents was set to 11.5 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 54 (Example 50) was obtained.

Sample 55 (Example 51)

Based on the whole inkjet ink of Sample 55 (Example 51), the compounding ratio of the Blue No. 1, which is the colorant, was set to 3.5 mass %, the compounding ratio of the purified water among the solvents was set to 59.0 mass %, the compounding ratio of the ethanol among the solvents was set to 11.5 mass %, the compounding ratio of the propylene glycol (PG) among the solvents was set to 10.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 55 (Example 51) was obtained.

Sample 56 (Example 52)

Based on the whole inkjet ink of Sample 56 (Example 52), the compounding ratio of the Blue No. 1, which is the colorant, was set to 3.5 mass %, the compounding ratio of the purified water among the solvents was set to 49.0 mass %, the compounding ratio of the ethanol among the solvents was set to 11.5 mass %, the compounding ratio of the propylene glycol (PG) among the solvents was set to 20.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 56 (Example 52) was obtained.

Sample 57 (Example 53)

Based on the whole inkjet ink of Sample 57 (Example 53), the compounding ratio of the Blue No. 1, which is the colorant, was set to 3.5 mass %, the compounding ratio of the purified water among the solvents was set to 41.0 mass %, the compounding ratio of the ethanol among the solvents was set to 11.5 mass %, the compounding ratio of the propylene glycol (PG) among the solvents was set to 28.0 mass %, the compounding ratio of the trehalose, which is the fixing agent (fading inhibitor), was set to 10.0 mass %, and the compounding ratio of the reduced isomaltulose, which is the fixing agent (fading inhibitor), was set to 6.0 mass %.

Thus, the inkjet ink of Sample 57 (Example 53) was obtained.

Sample 58 (Example 54)

Based on the whole inkjet ink of Sample 58 (Example 54), the compounding ratio of the Blue No. 1, which is the colorant, was set to 3.5 mass %, the compounding ratio of the purified water among the solvents was set to 59.0 mass %, the compounding ratio of the ethanol among the solvents was set to 11.5 mass %, the compounding ratio of the propylene glycol (PG) among the solvents was set to 10.0 mass %, and the compounding ratio of the trehalose, which is the fixing agent (fading inhibitor), was set to 16.0 mass %.

Thus, the inkjet ink of Sample 58 (Example 54) was obtained.

Sample 59 (Example 55)

Based on the whole inkjet ink of Sample 59 (Example 55), the compounding ratio of the Blue No. 1, which is the colorant, was set to 3.5 mass %, the compounding ratio of the purified water among the solvents was set to 50.5 mass %, the compounding ratio of the ethanol among the solvents was set to 20.0 mass %, the compounding ratio of the propylene glycol (PG) among the solvents was set to 10.0 mass %, and the compounding ratio of the trehalose, which is the fixing agent (fading inhibitor), was set to 16.0 mass %.

Thus, the inkjet ink of Sample 59 (Example 55) was obtained.

Sample 60 (Example 56)

Based on the whole inkjet ink of Sample 60 (Example 56), the compounding ratio of the Blue No. 1, which is the colorant, was set to 3.5 mass %, the compounding ratio of the Red No. 3, which is the colorant, was set to 0.5 mass %, the compounding ratio of the Red No. 102, which is the colorant, was set to 0.5 mass %, the compounding ratio of the Yellow No. 4, which is the colorant, was set to 0.5 mass %, the compounding ratio of the purified water among the solvents was set to 49.0 mass %, the compounding ratio of the ethanol among the solvents was set to 20.0 mass %, the compounding ratio of the propylene glycol (PG) among the solvents was set to 10.0 mass %, and the compounding ratio of the trehalose, which is the fixing agent (fading inhibitor), was set to 16.0 mass %.

Thus, the inkjet ink of Sample 60 (Example 56) was obtained.

Sample 61 (Example 57)

Based on the whole inkjet ink of Sample 61 (Example 57), the compounding ratio of the Blue No. 1, which is the colorant, was set to 3.5 mass %, the compounding ratio of the purified water among the solvents was set to 40.5 mass %, the compounding ratio of the ethanol among the solvents was set to 30.0 mass %, the compounding ratio of the propylene glycol (PG) among the solvents was set to 10.0 mass %, and the compounding ratio of the trehalose, which is the fixing agent (fading inhibitor), was set to 16.0 mass %.

Thus, the inkjet ink of Sample 61 (Example 57) was obtained.

Sample 62 (Example 58)

Based on the whole inkjet ink of Sample 62 (Example 58), the compounding ratio of the Blue No. 1, which is the colorant, was set to 3.5 mass %, the compounding ratio of the purified water among the solvents was set to 30.5 mass %, the compounding ratio of the ethanol among the solvents was set to 40.0 mass %, the compounding ratio of the propylene glycol (PG) among the solvents was set to 10.0 mass %, and the compounding ratio of the trehalose, which is the fixing agent (fading inhibitor), was set to 16.0 mass %.

Thus, the inkjet ink of Sample 62 (Example 58) was obtained.

Sample 63 (Example 59)

Based on the whole inkjet ink of Sample 63 (Example 59), the compounding ratio of the Blue No. 1, which is the colorant, was set to 3.5 mass %, the compounding ratio of the purified water among the solvents was set to 69.0 mass %, the compounding ratio of the ethanol among the solvents was set to 11.5 mass %, and the compounding ratio of the trehalose, which is the fixing agent (fading inhibitor), was set to 16.0 mass %.

Thus, the inkjet ink of Sample 63 (Example 59) was obtained.

Sample 64 (Example 60)

Based on the whole inkjet ink of Sample 64 (Example 60), the compounding ratio of the Blue No. 1, which is the colorant, was set to 3.5 mass %, the compounding ratio of the Red No. 3, which is the colorant, was set to 0.5 mass %, the compounding ratio of the Red No. 102, which is the colorant, was set to 0.5 mass %, the compounding ratio of the Yellow No. 4, which is the colorant, was set to 0.5 mass %, the compounding ratio of the purified water among the solvents was set to 67.5 mass %, the compounding ratio of the ethanol among the solvents was set to 11.5 mass %, and the compounding ratio of the trehalose, which is the fixing agent (fading inhibitor), was set to 16.0 mass %.

Thus, the inkjet ink of Sample 64 (Example 60) was obtained.

Sample 65 (Example 61)

Based on the whole inkjet ink of Sample 65 (Example 61), the compounding ratio of the Blue No. 1, which is the colorant, was set to 3.5 mass %, the compounding ratio of the purified water among the solvents was set to 59.0 mass %, the compounding ratio of the ethanol among the solvents was set to 11.5 mass %, the compounding ratio of the propylene glycol (PG) among the solvents was set to 10.0 mass %, and the compounding ratio of the trehalose, which is the fixing agent (fading inhibitor), was set to 16.0 mass %.

Thus, the inkjet ink of Sample 65 (Example 61) was obtained.

Sample 66 (Example 62)

Based on the whole inkjet ink of Sample 66 (Example 62), the compounding ratio of the Blue No. 1, which is the colorant, was set to 3.5 mass %, the compounding ratio of the purified water among the solvents was set to 49.0 mass %, the compounding ratio of the ethanol among the solvents was set to 11.5 mass %, the compounding ratio of the propylene glycol (PG) among the solvents was set to 20.0 mass, and the compounding ratio of the trehalose, which is the fixing agent (fading inhibitor), was set to 16.0 mass %.

Thus, the inkjet ink of Sample 66 (Example 62) was obtained.

Sample 67 (Example 63)

Based on the whole inkjet ink of Sample 67 (Example 63), the compounding ratio of the Blue No. 1, which is the colorant, was set to 3.5 mass %, the compounding ratio of the purified water among the solvents was set to 41.0 mass %, the compounding ratio of the ethanol among the solvents was set to 11.5 mass %, the compounding ratio of the propylene glycol (PG) among the solvents was set to 28.0 mass %, and the compounding ratio of the trehalose, which is the fixing agent (fading inhibitor), was set to 16.0 mass %.

Thus, the inkjet ink of Sample 67 (Example 63) was obtained.

Each of the above-described inks of Examples 1 to 63 and Comparative Examples 1 to 4 was passed through a membrane filter to remove solid foreign matter in the liquid. Specifically, each of the inks was passed once through a membrane filter (cellulose acetate film) having a pore size of 5.0 μm, and subsequently, was passed once through a membrane filter (cellulose acetate film) having a pore size of 0.8 μm to give a purified ink.

<Evaluation>

The purified ink obtained by the ink of each of Examples and Comparative Examples described above was evaluated for the lightfastness (ΔE, readability) and the printability using the following methods. The evaluation results are shown in Tables 1 to 6 shown later together with the ink compositions of Examples and Comparative Examples described above.

(Lightfastness test)

Using a piezoelectric ceramic-driven drop-on-demand inkjet head having a print resolution of 600 dpi in the main scanning direction and 600 dpi in the sub-scanning direction (conveyance direction of a recording medium, such as a tablet) and having 2, 656 nozzles in total, an image was printed on the following tablet using the purified inks of Examples 1 to 63 and Comparative Examples 1 to 4 at a printing drop quantity of 6 pl per drop.

The tablet as the printing target was a film-coated tablet for test (Base: conditioned starch, Coating agent: mixture of 70% hydroxypropyl methylcellulose and 30% titanium oxide, Diameter: 6.5 mm). The printed image was a circular solid image (Diameter: 4.0 mm). Thus, film-coated tablet printed matter was obtained.

The lightfastness test was performed in an environment in which the tester ambient moisture was set to 60% RH (25° C.).

Using a photostability tester (LT-120A-WD, Nagano Science), a cumulative 1.2 million lux of visible light was emitted to the film-coated tablet printed matter of Examples and Comparative Examples of which the chromaticity and the optical color density were measured. The chromaticity and the optical color density were measured using a spectrophotometer for the film-coated tablet printed matter irradiated with the visible light, and a comparison was made between the color differences $\Delta E$ (according to JIS Z 8781) indicating the change in the chromaticity and the optical color density before and after the irradiation with the visible light. The comparison results are shown in Tables 1 to 6. As described above, with respect to the change in the color tone before and after the irradiation with the visible light, the present inventors have derived the fact that, when the color difference $\Delta E$ according to JIS Z 8781 was 25 or less ($\Delta E \leq 25$), the photodiscoloration and/or photofading was sufficiently suppressed, and the inkjet ink had excellent lightfastness. Further, the present inventors have derived the fact that, when the color difference $\Delta E$ according to JIS Z 8781 was 25 or less ($\Delta E \leq 25$), the inkjet ink had excellent readability. Thus, assuming that, when $\Delta E \leq 25$ was satisfied, the inkjet inks had excellent lightfastness and excellent readability, the inkjet inks were evaluated as "Pass" in this evaluation.

The evaluation criteria of the readability are as follows.

Excellent: $\Delta E \leq 15$

Good: $\Delta E \leq 20$

Average: $\Delta E \leq 25$

Poor: $\Delta E > 25$ (Printability: Initial Discharge)

A piezoelectric ceramic-driven drop-on-demand inkjet head having a print resolution of 600 dpi in the main scanning direction and 600 dpi in the sub-scanning direction (conveyance direction of the recording medium, such as a tablet) and having 2, 656 nozzles in total was used for the inkjet head. Immediately after nozzle maintenance was carried out, a test pattern was printed using the inkjet head. Then, from the printing status of the test pattern, the readability of printed characters or images in connection with the occurrence of a discharge failure region was confirmed. The evaluation criteria are as follows.

Good: No discharge failure

Average: Readable

Poor: Unreadable

When the initial dischargeability was evaluated as "Good" or "Average", the inks were used without any problem, and therefore evaluated as "Pass".

The compositions and the evaluation results of the inkjet inks of Examples and Comparative examples are shown in Tables 1 to 6. In Tables 1 to 6, a "blank" portion indicates that the substance was not used. The units in Tables 1 to 6 are all "mass %".

TABLE 1

| | | | Comparative Example | Examples | | | | | |
| | | | #1 | #1 | #2 | #3 | #4 | #5 | #6 |
| | | | | | | Sample No. | | | |
| | | | 1 | 2 | 3 | 4 | 5 | 6 | 7 |
| Formula | Colorant | Blue No. 1 | 1.5% | 1.5% | 1.5% | 1.5% | 1.5% | 1.5% | 1.5% |
| | | Red No. 3 | | | | | | | |
| | | Red No. 102 | | | | | | | |
| | | Yellow No. 4 | | | | | | | |
| | Solvent | Water | 49.0% | 51.5% | 50.5% | 48.5% | 46.5% | 44.0% | 41.5% |
| | | Ethanol | 11.5% | 11.5% | 11.5% | 11.5% | 11.5% | 11.5% | 11.5% |
| | | PG (Propylene glycol) | 28.0% | 28.0% | 28.0% | 28.0% | 28.0% | 28.0% | 28.0% |
| | Fading inhibitor | Trehalose | | 2.5% | 2.5% | 2.5% | 2.5% | 5.0% | 7.5% |
| | | Reduced isomaltulose | 10.0% | 5.0% | 6.0% | 8.0% | 10.0% | 10.0% | 10.0% |
| | | Total | 100.0% | 100.0% | 100.0% | 100.0% | 100.0% | 100.0% | 100.0% |
| Lightfastness | | $\Delta E$ | 27.8 | 19.9 | 19.5 | 18.7 | 17.5 | 14.5 | 12.4 |
| *Tester ambient humidity 60% | | Readability | Poor | Good | Good | Good | Good | Excellent | Excellent |
| | | Printability | Good | Good | Good | Good | Good | Good | Good |

TABLE 1-continued

| | | | Examples | | | | | Comparative Example |
|---|---|---|---|---|---|---|---|---|
| | | | #7 | #8 | #9 | #10 | #11 | #2 |
| | | | | | Sample No. | | | |
| | | | 8 | 9 | 10 | 11 | 12 | 13 |
| Formula | Colorant | Blue No. 1 | 1.5% | 1.5% | 1.5% | 1.5% | 1.5% | 1.5% |
| | | Red No. 3 | | | 0.5% | | | |
| | | Red No. 102 | | | 0.5% | | | |
| | | Yellow No. 4 | | | 0.5% | | | |
| | Solvent | Water | 39.0% | 36.0% | 34.5% | 35.0% | 34.0% | 32.0% |
| | | Ethanol | 11.5% | 11.5% | 11.5% | 11.5% | 11.5% | 11.5% |
| | | PG (Propylene glycol) | 28.0% | 28.0% | 28.0% | 28.0% | 28.0% | 28.0% |
| | Fading inhibitor | Trehalose | 10.0% | 13.0% | 13.0% | 14.0% | 15.0% | 17.0% |
| | | Reduced isomaltulose | 10.0% | 10.0% | 10.0% | 10.0% | 10.0% | 10.0% |
| | | Total | 100.0% | 100.0% | 100.0% | 100.0% | 100.0% | 100.0% |
| Lightfastness | ΔE | | 11.3 | 8.5 | 7.3 | 7.7 | 6.6 | — |
| *Tester ambient humidity 60% | Readability | | Excellent | Excellent | Excellent | Excellent | Excellent | — |
| | Printability | | Good | Good | Good | Good | Good | Poor |

TABLE 2

| | | | Comparative Example | Examples | | | | |
|---|---|---|---|---|---|---|---|---|
| | | | #3 | #12 | #13 | #14 | #15 | #16 |
| | | | | | | Sample No. | | |
| | | | 14 | 15 | 16 | 17 | 18 | 19 |
| Formula | Colorant | Blue No. 1 | 3.0% | 5.0% | 5.0% | 3.0% | 3.0% | 1.5% |
| | | Red No. 3 | | | | | | |
| | | Red No. 102 | | | | | | |
| | | Yellow No. 4 | | | | | | |
| | Solvent | Water | 52.5% | 48.0% | 45.5% | 45.5% | 42.5% | 43.0% |
| | | Ethanol | 11.5% | 11.5% | 11.5% | 11.5% | 11.5% | 11.5% |
| | | PG (Propylene glycol) | 28.0% | 28.0% | 28.0% | 28.0% | 28.0% | 28.0% |
| | Fading inhibitor | Trehalose | 5.0% | 7.5% | 10.0% | 12.0% | 15.0% | 16.0% |
| | | Reduced isomaltulose | | | | | | |
| | | Total | 100.0% | 100.0% | 100.0% | 100.0% | 100.0% | 100.0% |
| Lightfastness | ΔE | | 27.5 | 19.4 | 16.4 | 16.6 | 14.8 | 18.3 |
| *Tester ambient humidity 60% | Readability | | Poor | Good | Good | Good | Excellent | Good |
| | Printability | | Good | Good | Good | Good | Good | Good |

| | | | Examples | | | Comparative Example |
|---|---|---|---|---|---|---|
| | | | #17 | #18 | #19 | #4 |
| | | | | | Sample No. | |
| | | | 20 | 21 | 22 | 23 |
| Formula | Colorant | Blue No. 1 | 1.5% | 1.5% | 1.5% | 1.5% |
| | | Red No. 3 | | 0.5% | | |
| | | Red No. 102 | | 0.5% | | |
| | | Yellow No. 4 | | 0.5% | | |
| | Solvent | Water | 41.0% | 39.5% | 39.0% | 37.0% |
| | | Ethanol | 11.5% | 11.5% | 11.5% | 11.5% |
| | | PG (Propylene glycol) | 28.0% | 28.0% | 28.0% | 28.0% |
| | Fading inhibitor | Trehalose | 18.0% | 18.0% | 20.0% | 22.0% |
| | | Reduced isomaltulose | | | | |
| | | Total | 100.0% | 100.0% | 100.0% | 100.0% |
| Lightfastness | ΔE | | 17.5 | 15.8 | 16.9 | — |
| *Tester ambient humidity 60% | Readability | | Good | Good | Good | — |
| | Printability | | Good | Good | Good | Poor |

35      36

TABLE 3

| | | | Examples | | | | | | |
|---|---|---|---|---|---|---|---|---|---|
| | | | #20 | #21 | #22 | #23 | #24 | #25 | #26 |
| | | | | | | Sample No. | | | |
| | | | 24 | 25 | 26 | 27 | 28 | 29 | 30 |
| Formula | Colorant | Blue No. 1 | 0.7% | 1.0% | 1.2% | 1.5% | 2.0% | 2.0% | 3.5% |
| | | Red No. 3 | | | | | | 0.5% | |
| | | Red No. 102 | | | | | | 0.5% | |
| | | Yellow No. 4 | | | | | | 0.5% | |
| | Solvent | Water | 35.8% | 35.5% | 35.3% | 40.0% | 39.5% | 38.0% | 38.0% |
| | | Ethanol | 11.5% | 11.5% | 11.5% | 11.5% | 11.5% | 11.5% | 11.5% |
| | | PG (Propylene glycol) | 28.0% | 28.0% | 28.0% | 28.0% | 28.0% | 28.0% | 28.0% |
| | Fading inhibitor | Trehalose | 15.0% | 15.0% | 15.0% | 10.0% | 10.0% | 10.0% | 10.0% |
| | | Reduced isomaltulose | 9.0% | 9.0% | 9.0% | 9.0% | 9.0% | 9.0% | 9.0% |
| | | Total | 100.0% | 100.0% | 100.0% | 100.0% | 100.0% | 100.0% | 100.0% |
| Lightfastness *Tester ambient humidity 60% | | ΔE | 17.0 | 12.3 | 10.6 | 11.3 | 9.5 | 7.4 | 7.1 |
| | | Readability | Average | Excellent | Excellent | Excellent | Excellent | Excellent | Excellent |
| | | Printability | Good | Good | Good | Good | Good | Good | Good |

| | | | Examples | | | | |
|---|---|---|---|---|---|---|---|
| | | | #27 | #28 | #29 | #30 | #31 |
| | | | | | Sample No. | | |
| | | | 31 | 32 | 33 | 34 | 35 |
| Formula | Colorant | Blue No. 1 | 4.5% | 5.0% | 10.0% | 15.0% | 17.0% |
| | | Red No. 3 | | | | | |
| | | Red No. 102 | | | | | |
| | | Yellow No. 4 | | | | | |
| | Solvent | Water | 42.0% | 41.5% | 43.0% | 38.0% | 36.0% |
| | | Ethanol | 11.5% | 11.5% | 11.5% | 11.5% | 11.5% |
| | | PG (Propylene glycol) | 28.0% | 28.0% | 28.0% | 28.0% | 28.0% |
| | Fading inhibitor | Trehalose | 5.0% | 5.0% | 2.5% | 2.5% | 2.5% |
| | | Reduced isomaltulose | 9.0% | 9.0% | 5.0% | 5.0% | 5.0% |
| | | Total | 100.0% | 100.0% | 100.0% | 100.0% | 100.0% |
| Lightfastness *Tester ambient humidity 60% | | ΔE | 9.6 | 7.5 | 4.2 | 2.4 | 2.2 |
| | | Readability | Excellent | Excellent | Excellent | Excellent | Excellent |
| | | Printability | Good | Good | Good | Good | Average |

TABLE 4

| | | | Examples | | | | | | |
|---|---|---|---|---|---|---|---|---|---|
| | | | #32 | #33 | #34 | #35 | #36 | #37 | #38 |
| | | | | | | Sample No. | | | |
| | | | 36 | 37 | 38 | 39 | 40 | 41 | 42 |
| Formula | Colorant | Blue No. 1 | 0.7% | 1.0% | 1.2% | 1.5% | 2.0% | 3.5% | 4.5% |
| | | Red No. 3 | | | | | | | |
| | | Red No. 102 | | | | | | | |
| | | Yellow No. 4 | | | | | | | |
| | Solvent | Water | 39.8% | 39.5% | 39.3% | 39.0% | 38.5% | 41.0% | 40.0% |
| | | Ethanol | 11.5% | 11.5% | 11.5% | 11.5% | 11.5% | 11.5% | 11.5% |
| | | PG (Propylene glycol) | 28.0% | 28.0% | 28.0% | 28.0% | 28.0% | 28.0% | 28.0% |
| | Fading inhibitor | Trehalose | 20.0% | 20.0% | 20.0% | 20.0% | 20.0% | 16.0% | 16.0% |
| | | Reduced isomaltulose | | | | | | | |
| | | Total | 100.0% | 100.0% | 100.0% | 100.0% | 100.0% | 100.0% | 100.0% |
| Lightfastness *Tester ambient humidity 60% | | ΔE | 24.6 | 19.5 | 19.3 | 14.3 | 13.4 | 11.9 | 11.1 |
| | | Readability | Average | Good | Good | Excellent | Excellent | Excellent | Excellent |
| | | Printability | Good | Good | Good | Good | Good | Good | Good |

TABLE 4-continued

| | | | Examples | | | | |
|---|---|---|---|---|---|---|---|
| | | | #39 | #40 | #41 | #42 | #43 |
| | | | | | Sample No. | | |
| | | | 43 | 44 | 45 | 46 | 47 |
| Formula | Colorant | Blue No. 1 | 4.5% | 5.0% | 10.0% | 15.0% | 17.0% |
| | | Red No. 3 | 0.5% | | | | |
| | | Red No. 102 | 0.5% | | | | |
| | | Yellow No. 4 | 0.5% | | | | |
| | Solvent | Water | 39.5% | 40.5% | 40.5% | 37.5% | 35.5% |
| | | Ethanol | 11.5% | 11.5% | 11.5% | 11.5% | 11.5% |
| | | PG (Propylene glycol) | 28.0% | 28.0% | 28.0% | 28.0% | 28.0% |
| | Fading inhibitor | Trehalose | 15.0% | 15.0% | 10.0% | 8.0% | 8.0% |
| | | Reduced isomaltulose | | | | | |
| | | Total | 100.0% | 100.0% | 100.0% | 100.0% | 100.0% |
| Lightfastness | | ΔE | 8.9 | 9.7 | 6.9 | 4.1 | 4.0 |
| *Tester ambient humidity 60% | | Readability | Excellent | Excellent | Excellent | Excellent | Excellent |
| | Printability | | Good | Good | Good | Good | Average |

TABLE 5

| | | | Examples | | | | | |
|---|---|---|---|---|---|---|---|---|
| | | | #44 | #45 | #46 | #47 | #48 | #49 |
| | | | | | Sample No. | | | |
| | | | 48 | 49 | 50 | 51 | 52 | 53 |
| Formula | Colorant | Blue No. 1 | 3.5% | 3.5% | 3.5% | 3.5% | 3.5% | 3.5% |
| | | Red No. 3 | | | 0.5% | | | |
| | | Red No. 102 | | | 0.5% | | | |
| | | Yellow No. 4 | | | 0.5% | | | |
| | Solvent | Water | 59.0% | 50.5% | 49.0% | 40.5% | 30.5% | 69.0% |
| | | Ethanol | 11.5% | 20.0% | 20.0% | 30.0% | 40.0% | 11.5% |
| | | PG (Propylene glycol) | 10.0% | 10.0% | 10.0% | 10.0% | 10.0% | |
| | Fading inhibitor | Trehalose | 10.0% | 10.0% | 10.0% | 10.0% | 10.0% | 10.0% |
| | | Reduced isomaltulose | 6.0% | 6.0% | 6.0% | 6.0% | 6.0% | 6.0% |
| | | Total | 100.0% | 100.0% | 100.0% | 100.0% | 100.0% | 100.0% |
| Lightfastness | | ΔE | 12.0 | 11.6 | 9.8 | 12.1 | 12.5 | 7.9 |
| *Tester ambient humidity 60% | | Readability | Excellent | Excellent | Excellent | Excellent | Excellent | Excellent |
| | Printability | | Good | Good | Good | Good | Good | Good |

| | | | Examples | | | |
|---|---|---|---|---|---|---|
| | | | #50 | #51 | #52 | #53 |
| | | | | | Sample No. | |
| | | | 54 | 55 | 56 | 57 |
| Formula | Colorant | Blue No. 1 | 3.5% | 3.5% | 3.5% | 3.5% |
| | | Red No. 3 | 0.5% | | | |
| | | Red No. 102 | 0.5% | | | |
| | | Yellow No. 4 | 0.5% | | | |
| | Solvent | Water | 67.5% | 59.0% | 49.0% | 41.0% |
| | | Ethanol | 11.5% | 11.5% | 11.5% | 11.5% |
| | | PG (Propylene glycol) | | 10.0% | 20.0% | 28.0% |
| | Fading inhibitor | Trehalose | 10.0% | 10.0% | 10.0% | 10.0% |
| | | Reduced isomaltulose | 6.0% | 6.0% | 6.0% | 6.0% |
| | | Total | 100.0% | 100.0% | 100.0% | 100.0% |
| Lightfastness | | ΔE | 7.0 | 9.2 | 10.4 | 11.4 |
| *Tester ambient humidity 60% | | Readability | Excellent | Excellent | Excellent | Excellent |
| | Printability | | Good | Good | Good | Good |

TABLE 6

|  |  |  | Examples | | | | | |
|---|---|---|---|---|---|---|---|---|
|  |  |  | #54 | #55 | #56 | #57 | #58 | #59 |
|  |  |  | | | Sample No. | | | |
|  |  |  | 58 | 59 | 60 | 61 | 62 | 63 |
| Formula | Colorant | Blue No. 1 | 3.5% | 3.5% | 3.5% | 3.5% | 3.5% | 3.5% |
|  |  | Red No. 3 |  |  | 0.5% |  |  |  |
|  |  | Red No. 102 |  |  | 0.5% |  |  |  |
|  |  | Yellow No. 4 |  |  | 0.5% |  |  |  |
|  | Solvent | Water | 59.0% | 50.5% | 49.0% | 40.5% | 30.5% | 69.0% |
|  |  | Ethanol | 11.5% | 20.0% | 20.0% | 30.0% | 40.0% | 11.5% |
|  |  | PG (Propylene glycol) | 10.0% | 10.0% | 10.0% | 10.0% | 10.0% |  |
|  | Fading inhibitor | Trehalose | 16.0% | 16.0% | 16.0% | 16.0% | 16.0% | 16.0% |
|  |  | Reduced isomaltulose |  |  |  |  |  |  |
|  |  | Total | 100.0% | 100.0% | 100.0% | 100.0% | 100.0% | 100.0% |
| Lightfastness *Tester ambient humidity 60% |  | ΔE | 10.8 | 12.1 | 9.6 | 12.5 | 12.7 | 10.7 |
|  |  | Readability | Excellent | Excellent | Excellent | Excellent | Excellent | Excellent |
| Printability |  |  | Good | Good | Good | Good | Good | Good |

|  |  |  | Examples | | | |
|---|---|---|---|---|---|---|
|  |  |  | #60 | #61 | #62 | #63 |
|  |  |  | | Sample No. | | |
|  |  |  | 64 | 65 | 66 | 67 |
| Formula | Colorant | Blue No. 1 | 3.5% | 3.5% | 3.5% | 3.5% |
|  |  | Red No. 3 | 0.5% |  |  |  |
|  |  | Red No. 102 | 0.5% |  |  |  |
|  |  | Yellow No. 4 | 0.5% |  |  |  |
|  | Solvent | Water | 67.5% | 59.0% | 49.0% | 41.0% |
|  |  | Ethanol | 11.5% | 11.5% | 11.5% | 11.5% |
|  |  | PG (Propylene glycol) |  | 10.0% | 20.0% | 28.0% |
|  | Fading inhibitor | Trehalose |  |  |  |  |
|  |  | Reduced isomaltulose |  |  |  |  |
|  |  | Total | 100.0% | 100.0% | 100.0% | 100.0% |
| Lightfastness *Tester ambient humidity 60% |  | ΔE | 8.9 | 11.3 | 11.5 | 12.9 |
|  |  | Readability | Excellent | Excellent | Excellent | Excellent |
| Printability |  |  | Good | Good | Good | Good |

40

As shown in Tables 1 to 6, the film-coated tablet printed matter of Examples 1 to 63 all had the color difference ΔE of 25 or less (ΔE $25) before and after the irradiation with the visible light as the results of the lightfastness test. Specifically, the film-coated tablet printed matter of Examples 1 to 63 had the color difference ΔE in the range of 2.2 to 24.6, and all had the color difference ΔE of less than 25 before and after the irradiation with the visible light. More specifically, the inkjet inks of Examples 1 to 63 were found to sufficiently suppress the photodiscoloration and/or photofading of the printed images and to be imparted with excellent lightfastness. In contrast thereto, in the film-coated tablet printed matter of Comparative Examples 1 to 4, the color difference ΔE before and after the irradiation with the visible light exceeded 25 (ΔE>25) or was unmeasurable as the results of the lightfastness test as shown in Tables 1 to 6. More specifically, the inkjet inks of Comparative Examples 1 to 4 were found to be not able to sufficiently suppress the photodiscoloration and/or photofading of the printed images and be insufficient in lightfastness.

The results of the lightfastness test described above showed that the inkjet ink containing the Blue No. 1 as the food dye; only trehalose as the fixing agent; and water and ethanol as the solvent, in which the compounding ratio of the trehalose is in the range of 7.5 mass % or more and 20.0 mass % or less based on the total mass of the inkjet ink sufficiently suppresses the photodiscoloration and/or photofading of the printed images and is imparted with excellent lightfastness.

Further, the results of the lightfastness test described above showed that the inkjet ink containing: Blue No. 1 as the food dye; trehalose and reduced isomaltulose as the fixing agent; and water and ethanol as the solvent, in which the compounding ratio of the trehalose is in the range of 2.5 mass % or more and 15.0 mass % or less based on the total mass of the inkjet ink and the compounding ratio of the reduced isomaltulose is 10.0 mass % or less based on the total mass of the inkjet ink sufficiently suppresses the photodiscoloration and/or photofading of the printed images and is imparted with excellent lightfastness.

Further, as shown in Tables 1 to 6, the inkjet inks of Examples 1 to 63 were found to all have the evaluation results of the printability (initial discharge) of "Average" or higher, and have excellent lightfastness and sufficient printability (initial discharge).

Further, the present invention can take the following compositions, for example.

(1) An inkjet ink containing: Blue No. 1 as a food dye; only trehalose as a fixing agent; and water and ethanol as a solvent, in which the compounding ratio of the trehalose is in the range of 7.5 mass % or more and 20.0 mass % or less based on the total mass of the inkjet ink.

(2) An inkjet ink containing: Blue No. 1 as a food dye; only trehalose as a fixing agent; and water and ethanol as a solvent, in which the compounding ratio of the trehalose is in the range of 15.0 mass % or more and 20.0 mass % or less based on the total mass of the inkjet ink.

(3) An inkjet ink containing: Blue No. 1 as a food dye; only trehalose as a fixing agent; and water and ethanol as a solvent, in which the compounding ratio of the trehalose is in the range of 15.0 mass % or more and 18.0 mass % or less based on the total mass of the inkjet ink.

(4) An inkjet ink containing: Blue No. 1 as a food dye; trehalose and reduced isomaltulose as a fixing agent; and water and ethanol as a solvent, in which the compounding ratio of the trehalose is in the range of 2.5 mass % or more and 15.0 mass or less based on the total mass of the inkjet ink, and the compounding ratio of the reduced isomaltulose is 10.0 mass % or less based on the total mass of the inkjet ink.

(5) An inkjet ink containing: Blue No. 1 as a food dye; trehalose and reduced isomaltulose as a fixing agent; and water and ethanol as a solvent, in which the compounding ratio of the trehalose is in the range of 5.0 mass % or more and 15.0 mass % or less based on the total mass of the inkjet ink, and the compounding ratio of the reduced isomaltulose is 10.0 mass % or less based on the total mass of the inkjet ink.

(6) An inkjet ink containing: Blue No. 1 as a food dye; trehalose and reduced isomaltulose as a fixing agent; and water and ethanol as a solvent, in which the compounding ratio of the trehalose is in the range of 7.5 mass % or more and 15.0 mass % or less based on the total mass of the inkjet ink, and the compounding ratio of the reduced isomaltulose is 8.0 mass % or more and 10.0 mass % or less based on the total mass of the inkjet ink.

(7) The inkjet ink according to any one of (1) to (6) above, in which the compounding ratio of the Blue No. 1 is in the range of 1.0 mass % or more and 15.0 mass % or less based on the total mass of the inkjet ink.

(8) The inkjet ink according to any one of (1) to (6) above, in which the compounding ratio of the Blue No. 1 is in the range of 1.0 mass % or more and 5.0 mass % or less based on the total mass of the inkjet ink.

(9) An inkjet ink containing: Blue No. 1 as a food dye; only trehalose as a fixing agent; and water and ethanol as a solvent, in which the compounding ratio of the Blue No. 1 is in the range of 3.5 mass % or more and 17.0 mass % or less based on the total mass of the inkjet ink, and the compounding ratio of the trehalose is in the range of 8.0 mass % or more and 16.0 mass % or less based on the total mass of the inkjet ink.

(10) An inkjet ink containing: Blue No. 1 as a food dye; trehalose and reduced isomaltulose as a fixing agent; and water and ethanol as a solvent, in which the compounding ratio of the Blue No. 1 is in the range of 1.5 mass % or more and 17.0 mass % or less based on the total mass of the inkjet ink, the compounding ratio of the trehalose is in the range of 2.5 mass % or more and 15.0 mass % or less based on the total mass of the inkjet ink, and the compounding ratio of the reduced isomaltulose is 5.0 mass % or more and 10.0 mass % or less based on the total mass of the inkjet ink.

(11) The inkjet ink according to any one of (1) to (10) above, further containing: propylene glycol as the solvent, in which the compounding ratio of the propylene glycol is 28.0 mass % or less based on the total mass of the inkjet ink.

(12) Tablet printed matter including: a printed part printed with the inkjet ink according to any one of (1) to (11) above.

The scope of the present invention is not limited to the illustrated and described exemplary embodiments, and also encompasses all the embodiments that achieve effects equivalent to the intended effects of the present invention. Further, the scope of the present invention is not limited to combinations of the features of the invention defined by claims, and can be defined by any desired combinations of specific features among all the disclosed features.

REFERENCE SIGNS LIST

1 substrate of tablet
1S surface
3 printed image
4 specific dye
5 uncoated tablet printed matter
7 film coating layer
9 film-coated tablet printed matter
11 uncoated tablet printed image (solid image)
13 film-coated tablet printed image (two-dimensional barcode)

The invention claimed is:

1. An inkjet ink comprising:
a food dye comprising Blue No. 1;
a fixing agent comprising trehalose and reduced isomaltulose; and
a solvent comprising water and ethanol, wherein
an amount of the trehalose is in a range of 2.5 mass % or more and 7.5 mass % or less based on a total mass of the inkjet ink,
an amount of the reduced isomaltulose is in a range of 5.0 mass % or more and 10.0 mass % or less based on the total mass of the inkjet ink;
the amount of the trehalose is less than the amount of the reduced isomaltulose, and
an amount of the Blue No. 1 is in a range of 1.5 mass % or more and 17.0 mass % or less based on the total mass of the inkjet ink.

2. An inkjet ink comprising:
a food dye comprising Blue No. 1;
a fixing agent comprising trehalose and reduced isomaltulose; and
a solvent comprising water and ethanol, wherein
an amount of the trehalose is in a range of 10.0 mass % or more and 15.0 mass % or less based on a total mass of the inkjet ink,
an amount of the reduced isomaltulose is in a range of 9.0 mass % or more and 10.0 mass % or less based on the total mass of the inkjet ink,
the amount of the trehalose is greater than the amount of the reduced isomaltulose, and
an amount of the Blue No. 1 is in a range of 0.7 mass % or more and 3.5 mass % or less based on the total mass of the inkjet ink.

3. An inkjet ink comprising:
a food dye comprising Blue No. 1;
a fixing agent comprising trehalose and reduced isomaltulose; and
a solvent comprising water and ethanol, wherein an amount of the trehalose is 10.0 mass % based on a total mass of the inkjet ink, an amount of the reduced isomaltulose is 10 mass % based on the total mass of the inkjet ink, and an amount of the Blue No. 1 is in a range of 1.0 mass % or more and 5.0 mass % or less based on the total mass of the inkjet ink.

4. The inkjet ink according to claim 1, further comprising:

the solvent further comprises propylene glycol, wherein an amount of the propylene glycol is 28.0 mass % or less based on the total mass of the inkjet ink.

5. The inkjet ink according to claim 2, further comprising:

the solvent further comprises propylene glycol, wherein an amount of the propylene glycol is 28.0 mass % or less based on the total mass of the inkjet ink.

6. Tablet printed matter comprising:

a printed part printed with the inkjet ink according to claim 2.

7. Tablet printed matter comprising:

a printed part printed with the inkjet ink according to claim 1.

8. Tablet printed matter comprising:

a printed part printed with the inkjet ink according to claim 3.

9. Tablet printed matter comprising:

a printed part printed with the inkjet ink according to claim 4.

10. Tablet printed matter comprising:

a printed part printed with the inkjet ink according to claim 5.

11. The inkjet ink according to claim 3, further comprising:

the solvent further comprises propylene glycol, wherein an amount of the propylene glycol is 28.0 mass % or less based on the total mass of the inkjet ink.

12. An inkjet ink comprising:

a food dye comprising Blue No. 1;

a fixing agent comprising trehalose and reduced isomaltulose; and a solvent comprising water, ethanol and propylene glycol, wherein an amount of the trehalose is in a range of 7.5 mass % or more and 15.0 mass % or less based on a total mass of the inkjet ink, an amount of the reduced isomaltulose is in a range of 8.0 mass % or more and 10.0 mass % or less based on the total mass of the inkjet ink, an amount of the Blue No. 1 is in a range of 1.0 mass % or more and 5.0 mass % or less based on the total mass of the inkjet ink, and an amount of the propylene glycol is 28.0 mass % or less based on the total mass of the inkjet ink.

13. Tablet printed matter comprising:

a printed part printed with the inkjet ink according to claim 11.

14. Tablet printed matter comprising:

a printed part printed with the inkjet ink according to claim 12.

\* \* \* \* \*